US012739934B2

(12) United States Patent
Wang et al.

(10) Patent No.: US 12,739,934 B2
(45) Date of Patent: Sep. 15, 2026

(54) METHODS, NODE, UE AND COMPUTER READABLE MEDIA FOR ALIGNING PARTIAL SENSING CONFIGURATION WITH DRX CONFIGURATION

(71) Applicant: Telefonaktiebolaget LM Ericsson (publ), Stockholm (SE)

(72) Inventors: Min Wang, Luleå (SE); Antonino Orsino, Kirkkonummi (FI); Shehzad Ali Ashraf, Munich (DE); Zhang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 423 days.

(21) Appl. No.: 18/282,879

(22) PCT Filed: Feb. 25, 2022

(86) PCT No.: PCT/SE2022/050194
§ 371 (c)(1),
(2) Date: Sep. 19, 2023

(87) PCT Pub. No.: WO2022/197228
PCT Pub. Date: Sep. 22, 2022

(65) Prior Publication Data

US 2024/0172321 A1 May 23, 2024

(30) Foreign Application Priority Data

Mar. 19, 2021 (WO) ................ PCT/CN2021/081682

(51) Int. Cl.
*H04W 76/28* (2018.01)
*H04W 74/0808* (2024.01)

(52) U.S. Cl.
CPC ....... *H04W 76/28* (2018.02); *H04W 74/0808* (2013.01)

(58) Field of Classification Search
CPC .......................... H04W 76/28; H04W 74/0808
USPC .......................................................... 370/328
See application file for complete search history.

(56) References Cited

U.S. PATENT DOCUMENTS

2021/0227602 A1* 7/2021 Li ......................... H04W 76/28
2022/0225408 A1* 7/2022 Lee ......................... H04W 4/40
2022/0232626 A1* 7/2022 Li ......................... H04W 72/02

OTHER PUBLICATIONS 63137083P (Year: 2021).*
R1-2101400 (Year: 2020).*

(Continued)

*Primary Examiner* — Intekhaab A Siddiquee
(74) *Attorney, Agent, or Firm* — COATS & BENNETT, PLLC

(57) ABSTRACT

The present disclosure provides methods (300, 400), a node (600), a UE (800), and computer readable media for aligning partial sensing configuration with DRX configuration. The method (300) at a node includes: generating (S301) one or more partial sensing configurations and one or more DRX configurations for a UE; and transmitting (S303), to the UE, the one or more partial sensing configurations, at least one of which is to be used by the first UE for partial sensing, and the one or more DRX configurations, at least one of which is to be used by the first UE for DRX, wherein the one or more partial sensing configurations are associated with the one or more DRX configurations.

20 Claims, 8 Drawing Sheets

(56) References Cited

OTHER PUBLICATIONS

Robert Bosch GMBH, “Discussion on Reduce Power Consumption for Sidelink”, 3GPP TSG RAN WG1 #104-e E-Meeting, Jan. 25-Feb. 5, 2020, pp. 1-10, R1-2101400, 3GPP.
Lenovo, et al., “Sidelink resource allocation for Power saving”, 3GPP TSG RAN WG1 #104-e e-Meeting, Jan. 25-Feb. 5, 2021, pp. 1-9, R1-2100766, 3GPP.
3rd Generation Partnership Project, “3rd Generation Partnership Project; Technical Specification Group Radio Access Network; Evolved Universal Terrestrial Radio Access (E-UTRA); Physical layer; Measurements (Release 16)”, Technical Specification, 3GPP TS 36.214 V16.1.0, Jun. 2020, pp. 1-26, 3GPP, France.
3rd Generation Partnership Project, “3rd Generation Partnership Project; Technical Specification Group Radio Access Network; Overall description of Radio Access Network (RAN) aspects for Vehicle-to-everything (V2X) based on LTE and NR (Release 16)”, Technical Report, 3GPP TR 37.985 V16.0.0, Jun. 2020, pp. 1-35, 3GPP, France.
LG Electronics, “WID revision: NR sidelink enhancement”, 3GPP TSG RAN Meeting #90e Electronic Meeting, Dec. 7-11, 2020, pp. 1-6, RP-202846, 3GPP.

* cited by examiner

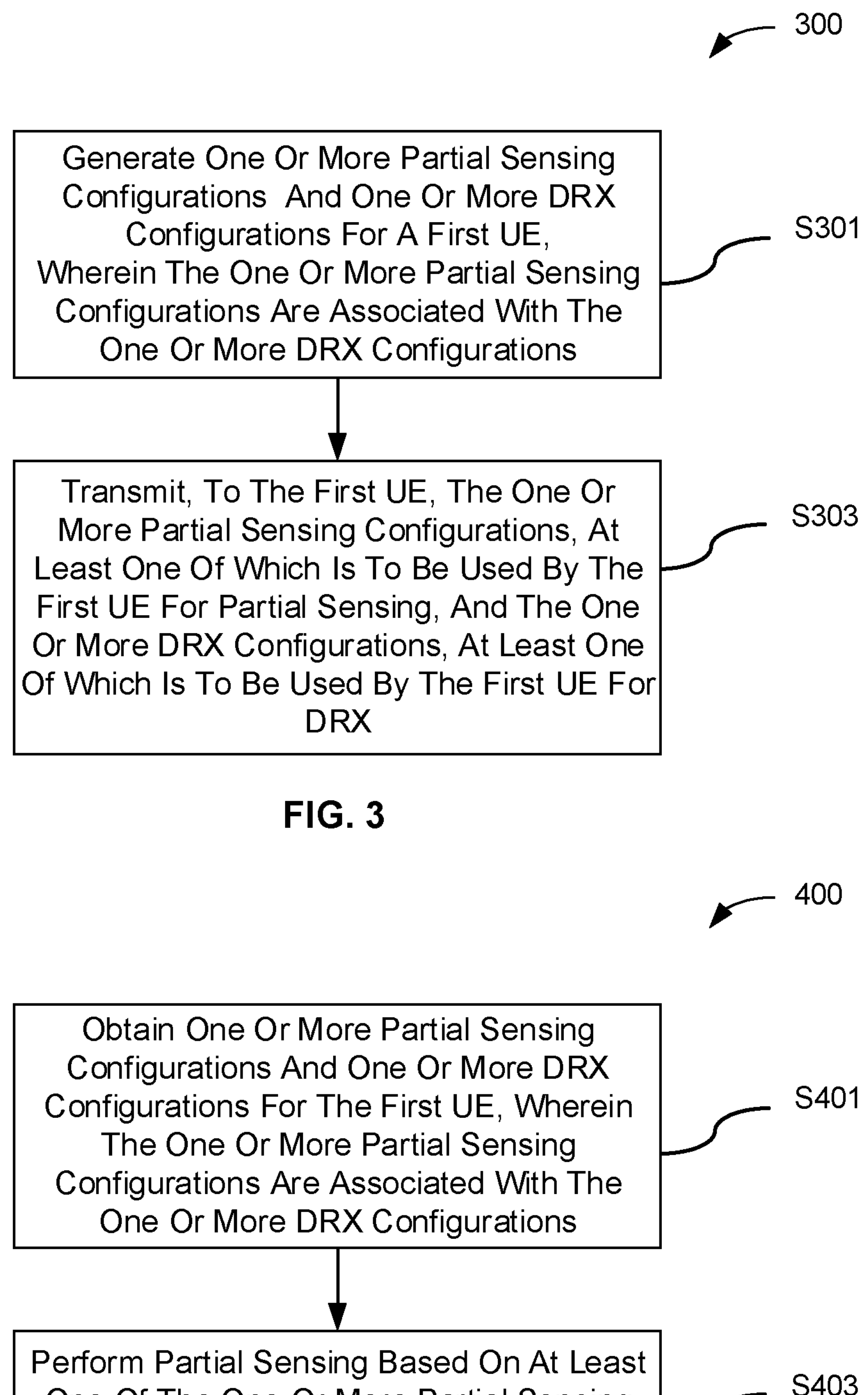
300
Generate One Or More Partial Sensing Configurations And One Or More DRX Configurations For A First UE, Wherein The One Or More Partial Sensing Configurations Are Associated With The One Or More DRX Configurations
S301
Transmit, To The First UE, The One Or More Partial Sensing Configurations, At Least One Of Which Is To Be Used By The First UE For Partial Sensing, And The One Or More DRX Configurations, At Least One Of Which Is To Be Used By The First UE For DRX
S303
FIG. 3
400
Obtain One Or More Partial Sensing Configurations And One Or More DRX Configurations For The First UE, Wherein The One Or More Partial Sensing Configurations Are Associated With The One Or More DRX Configurations
S401
Perform Partial Sensing Based On At Least One Of The One Or More Partial Sensing Configurations And/Or DRX Based On At Least One Of The One Or More DRX Configurations
S403
FIG. 4

METHODS, NODE, UE AND COMPUTER READABLE MEDIA FOR ALIGNING PARTIAL SENSING CONFIGURATION WITH DRX CONFIGURATION

TECHNICAL FIELD

The present disclosure generally relates to the technical field of communication technologies, and particularly to methods, a node, a User Equipment (UE) and computer readable media for aligning a partial sensing configuration with a Discontinuous Reception (DRX) configuration.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

New Radio (NR) Frame Structure

Similar to Long-Term Evolution (LTE), NR uses Orthogonal Frequency Division Multiplexing (OFDM) in the downlink (DL), i.e. from a network node, such as gNB, eNB, or base station, to a UE. The basic NR physical resource over an antenna port can thus be seen as a time-frequency grid as illustrated in FIG. 1, where a Resource Block (RB) in a 14-symbol slot is shown. An RB corresponds to 12 contiguous subcarriers in the frequency domain. RBs are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times 2^{\mu})$ kHz, where $\mu \in (0,1,2,3,4)$. $\Delta f=15$ kHz is the basic (or reference) subcarrier spacing that is also used in LTE.

In the time domain, downlink (DL) and uplink (UL) transmissions in NR will be organized into equally-sized subframes of 1 ms each, similar to LTE. A subframe is further divided into multiple slots of equal duration. The slot length for subcarrier spacing $\Delta f=(15\times 2^{\mu})$ kHz is $\frac{1}{2}^{\mu}$ ms. There is only one slot per subframe for $\Delta f=15$ kHz and a slot consists of 14 OFDM symbols.

Downlink transmissions are dynamically scheduled, i.e., in each slot the network node, such as gNB, transmits downlink control information (DCI) about which UE the DL data is to be transmitted to and which resource blocks in the current downlink slot the DL data is transmitted on. This control information is typically transmitted in the first one or two OFDM symbols in each slot in NR. The control information is carried on the Physical Control Channel (PDCCH), and data is carried on the Physical Downlink Shared Channel (PDSCH). The UE first detects and decodes PDCCH, and if a PDCCH is decoded successfully, it then decodes the corresponding PDSCH based on the downlink assignment provided by decoded control information in the PDCCH.

In addition to PDCCH and PDSCH, there are also other channels and reference signals transmitted in the downlink, including Synchronization Signal Block (SSB), Channel State Information-Reference Signal (CSI-RS), etc.

Uplink data transmissions, carried on Physical Uplink Shared Channel (PUSCH), can also be dynamically scheduled by the network node, such as gNB, by means of transmitting Downlink Control Information (DCI). The DCI, which is transmitted in the DL region, always indicates a scheduling time offset so that the PUSCH is transmitted in a slot in the UL region.

Sidelink (SL) Transmissions in NR

Sidelink transmissions over NR are specified for 3rd Generation Partnership Project (3GPP) Rel. 16. These are enhancements of the PRoximity-based SErvices (PRoSE) specified for LTE. Four new enhancements are particularly introduced to NR sidelink transmissions as follows:

- Support for unicast and groupcast transmissions are added in NR sidelink. For unicast and groupcast, the Physical Sidelink Feedback Channel (PSFCH) is introduced for a receiver UE to reply the decoding status to a transmitter UE.
- Grant-free transmissions, which are adopted in NR uplink transmissions, are also provided in NR sidelink transmissions, to improve the latency performance.
- To alleviate resource collisions among different sidelink transmissions launched by different UEs, it enhances channel sensing and resource selection procedures, which also lead to a new design of PSCCH.
- To achieve a high connection density, congestion control and thus the QoS management is supported in NR sidelink transmissions.

To enable the above enhancements, new physical channels and reference signals are introduced in NR (available in LTE before):

- PSSCH (Physical Sidelink Shared Channel, SL version of PDSCH): The PSSCH is transmitted by a sidelink transmitter UE, which conveys sidelink transmission data, System Information Blocks (SIBs) for Radio Resource Control (RRC) configuration, and a part of the Sidelink Control Information (SCI).
- PSFCH (SL version of PUCCH): The PSFCH is transmitted by a sidelink receiver UE for unicast and groupcast, which conveys 1-bit information over 1 RB for Hybrid Automatic Repeat Request (HARQ) Acknowledgement (ACK) and Negative ACK (NACK). In addition, Channel State Information (CSI) is carried in the Medium Access Control (MAC) Control Element (CE) over the PSSCH instead of the PSFCH.
- PSCCH (Physical Sidelink Common Control Channel, SL version of PDCCH): When the traffic to be sent to a receiver UE arrives at a transmitter UE, a transmitter UE should first send the PSCCH, which conveys a part of SCI (SL version of DCI) to be decoded by any UE for the channel sensing purpose, including the reserved time-frequency resources for transmissions, Demodulation Reference Signal (DMRS) pattern and antenna port, etc.
- Sidelink Primary/Secondary Synchronization Signal (S-PSS/S-SSS): Similar to downlink transmissions in NR, in sidelink transmissions, S-PSS and S-SSS are supported. Through detecting the S-PSS and S-SSS, a UE is able to identify the Sidelink Synchronization Identity (SSID) from the UE sending the S-PSS/S-SSS. Through detecting the S-PSS/S-SSS, a UE is therefore able to know the characteristics of the UE transmitting the S-PSS/S-SSS. A series of process of acquiring timing and frequency synchronization together with SSIDs of UEs is called initial cell search. Note that the UE sending the S-PSS/S-SSS may not be necessarily involved in sidelink transmissions, and a node (such as UE/eNB/gNB) sending the S-PSS/S-SSS is called a synchronization source. There are 2 S-PSS sequences and 336 S-SSS sequences forming a total of 672 SSIDs in a cell.

Physical Sidelink Broadcast Channel (PSBCH): The PSBCH is transmitted along with the S-PSS/S-SSS as a synchronization signal/PSBCH block (SSB). The SSB has the same numerology as PSCCH/PSSCH on that carrier, and an SSB should be transmitted within the bandwidth of the configured BWP. The PSBCH conveys information related to synchronization, such as the Direct Frame Number (DFN), indication of the slot and symbol level time resources for sidelink transmissions, in-coverage indicator, etc. The SSB is transmitted periodically at every 160 ms.

DMRS, Phase Tracking Reference Signal (PT-RS), CSI-RS: These physical reference signals supported by NR downlink/uplink transmissions are also adopted by sidelink transmissions. Similarly, the PT-RS is only applicable for FR2 transmission.

Another new feature is the two-stage SCI. This is a version of the DCI for SL. Unlike the DCI, only part (first stage) of the SCI is sent on the PSCCH. This part is used for channel sensing purposes (including the reserved time-frequency resources for transmissions, demodulation reference signal (DMRS) pattern and antenna port, etc.) and can be read by all UEs while the remaining (second stage) scheduling and control information, such as a 8-bits source identity (ID) and a 16-bits destination ID, New Data Indicator (NDI), Redundancy Version (RV), and HARQ process ID, is sent on the PSSCH to be decoded by the receiver UE.

Similar as for PRoSE in LTE, NR sidelink transmissions have the following two modes of resource allocations:

Mode 1: Sidelink resources are scheduled by a network node, such as gNB.

Mode 2: The UE autonomously selects sidelink resources from a (pre-)configured sidelink resource pool(s) based on the channel sensing mechanism.

For the in-coverage UE, the network node can be configured to adopt Mode 1 or Mode 2. For the out-of-coverage UE, only Mode 2 can be adopted.

As in LTE, scheduling over the sidelink in NR is done in different ways for Mode 1 and Mode 2.

Mode 1 supports the following two kinds of grants:

Dynamic grant: When the traffic to be sent over sidelink arrives at a transmitter UE, this UE should launch a four-message exchange procedure to request sidelink resources from a network node (such as gNB), including Scheduling Request (SR) on UL, grant, Buffer Status Report (BSR) on UL, grant for data on SL sent to UE. During the resource request procedure, a network node, such as gNB, may allocate a Sidelink Radio Network Temporary Identifier (SL-RNTI) to the transmitter UE. If this sidelink resource request is granted by the network node, then the network node indicates the resource allocation for the PSCCH and the PSSCH in the DCI conveyed by PDCCH with Cyclic Redundancy Check (CRC) scrambled with the SL-RNTI. When a transmitter UE receives such DCI, the transmitter UE can obtain the grant only if the scrambled CRC of DCI can be successfully solved by the assigned SL-RNTI. The transmitter UE then indicates the time-frequency resources and the transmission scheme of the allocated PSSCH in the PSCCH, and launches the PSCCH and the PSSCH on the allocated resources for sidelink transmissions. When a grant is obtained from the network node, the transmitter UE can only transmit a single Transport Block (TB). As a result, this kind of grant is suitable for traffic with a loose latency requirement.

Configured grant: For the traffic with a strict latency requirement, performing the four-message exchange procedure to request sidelink resources may induce unacceptable latency. In this case, prior to the traffic arrival, a transmitter UE may perform the four-message exchange procedure and request a set of resources. If a grant can be obtained from a network node, then the requested resources are reserved in a periodic manner. Upon traffic arriving at a transmitter UE, this UE can launch the PSCCH and the PSSCH on the upcoming resource occasion. In fact, this kind of grant is also known as grant-free transmissions.

In both dynamic grant and configured grant, a sidelink receiver UE cannot receive the DCI (since it is addressed to the transmitter UE), and therefore the receiver UE should perform blind decoding to identify the presence of PSCCH and find the resources for the PSSCH through the SCI.

When a transmitter UE launches the PSCCH, CRC is also inserted in the SCI without any scrambling.

Mode 2 Resource Allocation

In the Mode 2 resource allocation, when traffic arrives at a transmitter UE, this transmitter UE should autonomously select resources for the PSCCH and the PSSCH. To further minimize the latency of the feedback HARQ ACK/NACK transmissions and subsequently retransmissions, the transmitter UE may also reserve resources for PSCCH/PSSCH for retransmissions. To further enhance the probability of successful TB decoding at one shot and thus suppress the probability to perform retransmissions, the transmitter UE may repeat the TB transmission along with the initial TB transmission. This mechanism is also known as blind retransmission. As a result, when traffic arrives at the transmitter UE, then this transmitter UE should select resources for the following transmissions:

1) the PSSCH associated with the PSCCH for initial transmission and blind retransmissions;

2) the PSSCH associated with the PSCCH for retransmissions.

Since each transmitter UE in sidelink transmissions should autonomously select resources for above transmissions, how to prevent different transmitter UEs from selecting the same resources turns out to be a critical issue in Mode 2. A particular resource selection procedure is therefore imposed to Mode 2 based on channel sensing. The channel sensing algorithm involves measuring Reference Signal Received Power (RSRP) on different subchannels and requires knowledge of the different UEs power levels of DMRS on the PSSCH or the DMRS on the PSCCH depending on the configuration. This information is known only after receiving SCI launched by (all) other UEs. The sensing and selection algorithm is rather complex.

As described in Clause 6.3.2.2 in 3GPP TR 37.985 v16.0.0 (which is incorporated herein in its entirety by reference), Mode 2 is for UE autonomous resource selection. Its basic structure is of a UE sensing, within a (pre-) configured resource pool, which resources are not in use by other UEs with higher-priority traffic, and choosing an appropriate amount of such resources for its own transmissions. Having selected such resources, the UE can transmit and re-transmit in them a certain number of times, or until a cause of resource reselection is triggered.

The Mode 2 sensing procedure can select and then reserve resources for a variety of purposes reflecting that NR Vehicle-to-everything (V2X) introduces sidelink HARQ in support of unicast and groupcast in the physical layer. It may reserve resources to be used for a number of blind (re-) transmissions or HARQ-feedback-based (re-)transmissions of a transport block, in which case the resources are indicated in the SCI(s) scheduling the transport block. Alternatively or additionally, it may select resources to be used for the initial transmission of a later transport block, in which case the resources are indicated in an SCI scheduling a current transport block, in a manner similar to the LTE-V2X scheme (as described in Clause 5.2.2.2 in 3GPP TR 37.985 v16.0.0). Finally, an initial transmission of a transport block can be performed after sensing and resource selection, but without a reservation.

The first-stage SCIs transmitted by UEs on PSCCH indicate the time-frequency resources in which the UE will transmit a PSSCH. These SCI transmissions are used by sensing UEs to maintain a record of which resources have been reserved by other UEs in the recent past. When a resource selection is triggered (e.g. by traffic arrival or a re-selection trigger), the UE considers a sensing window which starts a (pre-)configured time in the past and finishes shortly before the trigger time. The window can be either 1100 ms or 100 ms wide, with the intention that the 100 ms option is particularly useful for aperiodic traffic, and 1100 ms particularly for periodic traffic. A sensing UE also measures the SL-RSRP in the slots of the sensing window, which implies the level of interference which would be caused and experienced if the sensing UE were to transmit in them. In NR-V2X, SL-RSRP is a (pre-)configurable measurement of either PSSCH-RSRP or PSCCH-RSRP.

The sensing UE then selects resources for its (re-)transmission(s) from within a resource selection window. The window starts shortly after the trigger for (re-)selection of resources, and cannot be longer than the remaining latency budget of the packet due to be transmitted. Reserved resources in the selection window with SL-RSRP above a threshold are excluded from being candidates by the sensing UE, with the threshold set according to the priorities of the traffic of the sensing and transmitting UEs. Thus, a higher priority transmission from a sensing UE can occupy resources which are reserved by a transmitting UE with sufficiently low SL-RSRP and sufficiently lower-priority traffic.

If the set of resources in the selection window which have not been excluded is less than a certain proportion of the available resources within the window, the SL-RSRP exclusion threshold is relaxed in 3 dB steps. The proportion is set by (pre-)configuration to 20%, 35%, or 50% for each traffic priority. The UE selects an appropriate amount of resources randomly from this non-excluded set. The resources selected are not in general periodic. Up to three resources can be indicated in each SCI transmission, which can each be independently located in time and frequency. When the indicated resources are for semi-persistent transmission of another transport block, the range of supported periodicities is expanded compared to LTE-V2X, in order to cover the broader set of envisioned use cases in NR-V2X.

Shortly before transmitting in a reserved resource, a sensing UE re-evaluates the set of resources from which it can select, to check whether its intended transmission is still suitable, taking account of late-arriving SCIs due, typically, to an aperiodic higher-priority service starting to transmit after the end of the original sensing window. If the reserved resources would not be part of the set for selection at this time (T3), then new resources are selected from the updated resource selection window. The cut-off time T3 is long enough before transmission to allow the UE to perform the calculations relating to resource re-selection.

The timeline of the sensing and resource (re-)selection windows with respect to the time of trigger n is shown in FIG. 2A (which is corresponding to FIG. 6.3.2.2-2(a) in 3GPP TR 37.985 V16.0.0). As shown in FIG. 2A, the timeline of sensing and resource (re-)selection procedure is triggered at time n, without re-evaluation before (m-T3), wherein its first reserved resource is at time m. The effect of the possibility of re-evaluation before first use of the reservation is shown in FIG. 2B (which is corresponding to in FIG. 6.3.2.2-2(b) in 3GPP TR 37.985 V 16.0.0). As shown in FIG. 2B, the timeline of sensing and resource (re-) selection procedure is originally triggered at time n, which has a first reserved resource at time m, when re-evaluation occurring at m-T3 determines the resources are no longer selectable. The new re-evaluation cut-off becomes (m'-T3).

There are a number of triggers for resource re-selection, several of which are similar to LTE-V2X in Clause 5.2.2.2 in 3GPP TR 37.985 V 16.0.0. In addition, there is the possibility to configure a resource pool with a pre-emption function designed to help accommodate aperiodic sidelink traffic, so that a UE reselects all the resources it has already reserved in a particular slot if another nearby UE with higher priority indicates it will transmit in any of them, implying a high-priority aperiodic traffic arrival at the other UE, and the SL-RSRP is above the exclusion threshold. The application of pre-emption can apply between all priorities of data traffic, or only when the priority of the pre-empting traffic is higher than a threshold and higher than that of the pre-empted traffic. A UE does not need to consider the possibility of pre-emption later than time T3 before the particular slot containing the reserved resources.

Pedestrian UE in V2X

V2X includes communications between Pedestrian UEs and Vehicular UEs, i.e. Vehicle-to-Pedestrian (V2P). Whereas a vehicular UE is assumed to be attached to the vehicle's power supply, and thus to have no particular battery life concerns, the situation is different for a P-UE. A P-UE could be, e.g. a conventional smartphone running suitable applications, or a specialized device attached to a pedestrians clothing, etc. In either case, battery life has to be considered so that the device will provide the V2P services for a reasonable length of time without need of re-charging, and without imposing such battery drain that V2P applications could become unattractive.

As described previously, a V2X UE performs sensing continuously in a 1000 ms historical window, implying an amount of ongoing power consumption due to the sensing procedure. It is allowed for a P-UE to not support sidelink reception, so that it is only broadcasting packets relating to its own location and direction. This type of P-UE is allowed to select transmission resources randomly, with no sensing procedure.

Resource Pool in V2X

As described in Clause 6.3.1.2 in 3GPP TR 37.985 V 16.0.0, PSCCH and PSSCH resources are defined within resource pools for the respective channels. This concept is used because in general PSCCH/PSSCH cannot be transmitted (and thus are not expected to be received) in all RBs and slots in the NR system bandwidth, nor within the frequency span configured for V2X sidelink. The notion of a resource pool also reflects, in resource allocation mode 2, that a UE will make its resource selections based on sensing within the pool.

A resource pool is divided into sub-channels in the frequency domain, which are consecutively non-overlapping sets of PRBs in a slot, the size depending on (pre-) configuration. Resource allocation, sensing, and resource selection are performed in units of a sub-channel. The UE's PSCCH occupies a (pre-)configurable number of PRBs within one sub-channel, starting from the lowest PRB of the PSSCH it schedules.

Within the slots that can be used for PSSCH transmission, there can be a number (e.g. from 7 to 14) of the symbols reserved for sidelink operation, of which PSSCH can be transmitted in a number (e.g., 5 to 12) of symbols. The remaining sidelink symbols transmit some or all of PSCCH, PSFCH, and other symbol(s) such as guard symbol(s).

Resource pools are (pre-)configured to a UE separately from the transmission perspective (TX pools) and the reception perspective (RX pools). This allows a UE to monitor for PSCCH, and hence receive PSSCH transmissions, in resource pools other than those in which it transmits, so that it can attempt to receive transmissions made by other UEs in those RX pools.

In addition, there are exceptional resource pools configured to a UE, in its serving cell's broadcast or in dedicated signaling. These can be used e.g. during Radio Link Failure (RLF) in some cases, handover, transition from RRC IDLE to RRC CONNECTED, or during change of dedicated V2X sidelink resource pools within a cell. In these cases, a UE may not have a stable configuration of TX resource pools but nevertheless should not be removed from the V2X system, and so it can randomly select resources in the exceptional pool, and use them temporarily. Likewise, UEs need to monitor the exceptional TX pools for PSCCH transmissions.

SL Congestion Control

As described in Clause 5.3 in 3GPP TR 37.985 V 16.0.0, for LTE V2X feature, a physical measurement of Channel Busy Ratio (CBR) is also defined in each subframe in Clause 5.1.30 of TS 36.214 V16.1.0 (which is incorporated herein in its entirety by reference), which measures the portion of the resource in a resource pool which has high received signal energy, such as Sidelink-Received Signal Strength Indicator (S-RSSI), in the most recent 100 subframes. CBR is a measurement of the congestion present recently in the resource pool. Another measurement, Channel occupancy Ratio (CR) defined in clause 5.1.31 of TS 36.214 V16.1.0, counts the total number of subchannels a UE has and will transmit in during a window of up to 1000 ms including the current subframe. CR is thus a measurement of how much resource a UE has recently, and will soon, claim.

A UE can be (pre-)configured with a set of CBR ranges to each of which is linked a CR-limit. When a UE finds its CR exceeds the CR-limit for the CBR range it currently measures, it must reduce its CR to not exceed the limit. How this is done is up to UE implementation, and can include increasing Modulation and Coding Scheme (MCS) to reduce resource occupation, dropping (re-)transmissions, etc. ProSe Per-Packet Priority (PPPP) can also be (pre-)configured with a mapping to the UE's maximum permitted transmit power, the limitation on which acts to reduce the CBR measured by sufficiently distant UEs.

PPPP is used as described in Clause 5.2.2 in 3GPP TR 37.985 V 16.0.0 to aid distributed sidelink congestion control based on the relative priorities of traffic from UEs that consider occupying a given resource. PPPP and CBR can each also be (pre-)configured with mappings to ranges of values of transmission parameters, e.g. a range of MCS values, and/or a range of numbers of subchannels, etc. In this case, the UE has to choose its transmission parameters from within the range corresponding to the prevailing PPPP and/or CBR.

Congestion control for NR-V2X is similar to LTE-V2X, and it likewise is used in resource allocation mode 2 in NR. The main differences are that each packet is associated with a single 'priority' value, passed down to the physical layer from upper layers, which is comparable to PPPP in LTE-V2X. The priority value is transmitted in the first-stage SCI associated with each transport block. Broadly equivalent measurements of CBR and CR, together with CR-limits are defined, which can be used similarly to constrain the ranges of transmission parameters. NR V2X sets a shorter time of 1 ms or 2 ms in which the UE must calculate the CR and CBR than LTE-V2X's 4 ms, with the aim of adapting to faster fluctuations in congestion due to aperiodic traffic.

It is desired to further enhance performance of sidelink, e.g., NR sidelink for V2X, public safety and commercial use cases.

SUMMARY

The present disclosure is proposed to achieve at least the following objectives.

- Resource allocation enhancement
  - Specify resource allocation to reduce power consumption of the UEs
    - Baseline is to introduce the principle of Rel-14 LTE sidelink random resource selection and partial sensing to Rel-16 NR sidelink resource allocation Mode 2.
    - Note: Taking Rel-14 as the baseline does not preclude introducing a new solution to reduce power consumption for the cases where the baseline cannot work properly.
    - This work should consider the impact of sidelink DRX, if any.
  - Study the feasibility and benefit of solutions on the enhancement(s) in Mode 2 for enhanced reliability and reduced latency in consideration of both Packet Reception Ratio (PRR) and Packet Inter-Reception (PIR) defined in 3GPP TR 37.885 V15.3.0 (which is incorporated herein in its entirety by reference), and specify the identified solution(s) if deemed feasible and beneficial [RAN1, RAN2]
    - Inter-UE coordination with the following.
      - A set of resources is determined at UE-A. This set is sent to UE-B in Mode 2, and UE-B takes this into account in the resource selection for its own transmission.
    - Note: The solution should be able to operate in-coverage, partial coverage, and out-of-coverage and to address consecutive packet loss in all coverage scenarios.
    - Note: RAN2 work will start after [RAN#89].
- Sidelink DRX for broadcast, groupcast, and unicast [RAN2]
  - Define on- and off-durations in sidelink and specify the corresponding UE procedure
  - Specify mechanism aiming to align sidelink DRX wake-up time among the UEs communicating with each other
  - Specify mechanism aiming to align sidelink DRX wake-up time with Uu DRX wake-up time in an in-coverage UE In LTE, partial sensing was introduced for pedestrian UEs. For the basic V2X safety services considered at the time, the assumption was that pedestrian UEs would act only as transmitters. There is no mechanism for aligning TX and RX behaviors for partial sensing. The alignment issue was solved with the implicit assumption that RX UEs would perform full sensing and monitor the channel continuously. Thus, the issue of TX and RX alignment must be considered when designing partial sensing feature.

On the other hand, TX/RX alignment consists of defining coordinated Active/Inactive times of the UEs. That is, defining assumptions on the times when the UE is (not) expected to monitor the channel, as well as the corresponding mechanism for configuring the UEs. DRX needs to be aligned. Moreover, it is desirable not to duplicate functionalities in different layers.

In order to achieve TX/RX alignment in DRX design, the present disclosure introduces interaction/coordination mechanisms between partial sensing and DRX (such as SL DRX), providing a unified solution on how to achieve TX/RX alignment without overlapping design efforts.

In the embodiments of the present disclosure, it is proposed that a UE can be configured with a plurality of DRX configurations and/or a plurality of partial sensing configurations. Methods on how to achieve alignment/coordination between the DRX configurations and the partial sensing configurations are designed. In addition, signaling details on how to configure a partial sensing configuration is also proposed.

According to a first aspect of the present disclosure, a method at a node includes: generating one or more partial sensing configurations and one or more DRX configurations for a first UE; and transmitting, to the first UE, the one or more partial sensing configurations, at least one of which is to be used by the first UE for partial sensing, and the one or more DRX configurations, at least one of which is to be used by the first UE for DRX, wherein the one or more partial sensing configurations are associated with the one or more DRX configurations.

In an exemplary embodiment, the one or more DRX configurations are generated based on at least one partial sensing configuration that is currently in use.

In an exemplary embodiment, there is a mapping relationship between the one or more DRX configurations and the one or more partial sensing configurations, and the mapping relationship enables the first UE to perform partial sensing based on a partial sensing configuration at a time slot when the first UE is active according to a corresponding DRX configuration.

In an exemplary embodiment, at least identification information of at least one corresponding partial sensing configuration is included in each of the one or more DRX configurations, or at least identification information of at least one corresponding DRX configuration is included in each of the one or more partial sensing configurations.

In an exemplary embodiment, the method further includes: configuring a mapping relationship by linking identification information of the one or more DRX configurations to identification information of the one or more corresponding partial sensing configurations, wherein the mapping relationship is configured in such a way that the first UE can perform partial sensing based on a partial sensing configuration at a time slot when the first UE is active according to a corresponding DRX configuration; and transmitting the configured mapping relationship to the first UE.

In an exemplary embodiment, the mapping relationship is configured based on associated applications, services, traffic types, logical channels, and/or logical channel groups.

In an exemplary embodiment, the mapping relationship includes at least one of:

a one-to-one mapping between the one or more DRX configurations and the one or more partial sensing configurations, a multiple-to-one mapping between the one or more DRX configurations and the one or more partial sensing configurations, or a one-to-multiple mapping between the one or more DRX configurations and the one or more partial sensing configurations.

In an exemplary embodiment, the partial sensing configuration includes at least one of:

identification information of the partial sensing configuration;

identification information of resource pools related to the partial sensing configuration;

information of applications, services, traffic types, logical channels, and/or logical channel groups associated with the partial sensing configuration; or parameters related to a partial sensing operation based on the partial sensing configuration.

In an exemplary embodiment, the information of applications, services, traffic types, logical channels, and/or logical channel groups associated with the partial sensing configuration includes at least one of:

identification information of applications, services, traffic types, logical channels, and/or logical channel groups associated with the partial sensing configuration;

priority information of applications, services, traffic types, logical channels, and/or logical channel groups associated with the partial sensing configuration; or Quality of Service (QoS) requirement information of applications, services, traffic types, logical channels or logical channel groups.

In an exemplary embodiment, the parameters related to the partial sensing operation based on the partial sensing configuration include at least one of:

a duration of a sensing window of the partial sensing operation;

parameters indicating sensing slots of the partial sensing operation;

an indicator indicating whether partial sensing is allowed to be performed during a DRX inactive slot;

a maximum number of sensing slots during the sensing window;

a minimum number of sensing slots during the sensing window; or a periodicity defining how often periodic partial sensing should be performed.

In an exemplary embodiment, the one or more partial sensing configurations include at least one of:

a common partial sensing configuration applicable to all applications, services, traffic types, logical channels, and/or logical channel groups of the first UE per resource pool, or a dedicated partial sensing configuration applicable to specific applications, services, traffic types, logical channels, and/or logical channel groups of the first UE, wherein the dedicated partial sensing configuration has a higher priority than the common partial sensing configuration in use.

In an exemplary embodiment, the method further includes: activating at least one of the one or more partial sensing configurations for use by the UE for partial sensing by transmitting, to the first UE, identification information of the at least one partial sensing configuration that needs to be activated.

In an exemplary embodiment, the method further includes: deactivating at least one of the one or more partial sensing configurations by transmitting, to the first UE, identification information of the at least one partial sensing configuration that needs to be deactivated.

In an exemplary embodiment, the method further includes: configuring a selection rule to the first UE, indicating the first UE to select the at least one of the one or more partial sensing configurations for partial sensing based on at least one of:

an application, a service, a traffic type, a logical channel, and/or a logical channel group, that is associated with the at least one partial sensing configuration, being used by the first UE;

a priority of an application, a service, a traffic type, a logical channel, and/or a logical channel group that is associated with the at least one partial sensing configuration; or a QoS requirement of an application, a service, a traffic type, a logical channel, and/or a logical channel group that is associated with the at least one partial sensing configuration.

In an exemplary embodiment, the node is a network node serving the first UE, and said transmitting the one or more partial sensing configurations, said activating at least one of the one or more partial sensing configurations, said deactivating at least one of the one or more partial sensing configurations, and said configuring the selection rule are implemented via same or different signaling from the network node to the first UE.

In an exemplary embodiment, the signaling includes at least one of:

system information, a paging message, a control Protocol Data Unit (PDU) of a protocol layer, DCI, a Media Access Control (MAC) Control Element (CE), dedicated RRC signaling, or a handover command.

In an exemplary embodiment, the node is a second UE in direct communication with the first UE, and said transmitting the one or more partial sensing configurations, said activating at least one of the one or more partial sensing configurations, said deactivating at least one of the one or more partial sensing configurations, and said configuring the selection rule are implemented via same or different signaling from the second UE to the first UE.

In an exemplary embodiment, the signaling includes at least one of:

PC5-RRC signaling, a control PDU of a protocol layer, a MAC CE, or

SCI.

According to a second aspect of the present disclosure, a method at a first UE includes: obtaining one or more partial sensing configurations and one or more DRX configurations for the first UE, wherein the one or more partial sensing configurations are associated with the one or more DRX configurations; and performing partial sensing based on at least one of the one or more partial sensing configurations and/or DRX based on at least one of the one or more DRX configurations.

In an exemplary embodiment, the one or more DRX configurations are obtained based on at least one partial sensing configuration that is currently in use.

In an exemplary embodiment, there is a mapping relationship between the one or more DRX configurations and the one or more partial sensing configurations, and the mapping relationship enables the first UE to perform partial sensing based on a partial sensing configuration at a time slot when the first UE is active according to a corresponding DRX configuration.

In an exemplary embodiment, at least identification information of at least one corresponding partial sensing configuration is included in each of the one or more DRX configurations, or at least identification information of at least one corresponding DRX configuration is included in each of the one or more partial sensing configurations.

In an exemplary embodiment, the method further includes: obtaining a mapping relationship which links identification information of the one or more DRX configurations to identification information of the one or more corresponding partial sensing configurations, wherein the mapping relationship is configured by a node or is preconfigured to the first UE in such a way that the first UE can perform partial sensing based on a partial sensing configuration at a time slot when the first UE is active according to a corresponding DRX configuration.

In an exemplary embodiment, the mapping relationship is configured or preconfigured based on associated applications, services, traffic types, logical channels, and/or logical channel groups.

In an exemplary embodiment, the mapping relationship includes at least one of:

a one-to-one mapping between the one or more DRX configurations and the one or more partial sensing configurations, a multiple-to-one mapping between the one or more DRX configurations and the one or more partial sensing configurations, or a one-to-multiple mapping between the one or more DRX configurations and the one or more partial sensing configurations.

In an exemplary embodiment, the partial sensing configuration includes at least one of:

identification information of the partial sensing configuration;

identification information of resource pools related to the partial sensing configuration;

information of applications, services, traffic types, logical channels, and/or logical channel groups associated with the partial sensing configuration; or parameters related to a partial sensing operation based on the partial sensing configuration.

In an exemplary embodiment, the information of applications, services, traffic types, logical channels, and/or logical channel groups associated with the partial sensing configuration includes at least one of:

identification information of applications, services, traffic types, logical channels, and/or logical channel groups associated with the partial sensing configuration;

priority information of applications, services, traffic types, logical channels, and/or logical channel groups associated with the partial sensing configuration; or QoS requirement information of applications, services, traffic types, logical channels or logical channel groups.

In an exemplary embodiment, the parameters related to the partial sensing operation based on the partial sensing configuration include at least one of:

a duration of a sensing window of the partial sensing operation;

parameters indicating sensing slots of the partial sensing operation;

an indicator indicating whether the partial sensing operation is allowed to be performed during a Discontinuous Reception DRX' inactive slot;

a maximum number of sensing slots during the sensing window;

a minimum number of sensing slots during the sensing window; or a periodicity defining how often periodic partial sensing should be performed.

In an exemplary embodiment, when the first UE selects to use a different DRX configuration in an upper layer, the upper layer determines a corresponding partial sensing configuration based on the mapping relationship, and informs a lower layer of the corresponding partial sensing configuration.

In an exemplary embodiment, when the first UE builds up a PDU of an upper layer that contains data related to an application, a service, a traffic type, a logical channel, and/or a logical channel group, the upper layer determines a DRX configuration associated with the application, the service, the traffic type, the logical channel, and/or the logical channel group based on the PDU, determines a corresponding partial sensing configuration based on the mapping relationship, and informs a lower layer of the corresponding partial sensing configuration; or the upper layer informs a lower layer of information on the application, the service, the traffic type, the logical channel, and/or the logical channel group, and the lower layer determines a corresponding partial sensing configuration.

In an exemplary embodiment, the upper layer is a MAC layer, and the lower layer is a physical layer.

In an exemplary embodiment, whether partial sensing is performed during a DRX inactive slot is determined by the first UE according to a specific rule that is configured by the node or is preconfigured to the first UE.

In an exemplary embodiment, the one or more partial sensing configurations are obtained by receiving the one or more partial sensing configurations from a node, or by preconfiguration.

In an exemplary embodiment, the one or more DRX configurations are obtained by receiving the one or more DRX configurations from the node, or by preconfiguration.

In an exemplary embodiment, the one or more partial sensing configurations include at least one of:

a common partial sensing configuration applicable to all applications, services, traffic types, logical channels, and/or logical channel groups of the first UE per resource pool, or a dedicated partial sensing configuration applicable to specific applications, services, traffic types, logical channels, and/or logical channel groups of the first UE, wherein the dedicated partial sensing configuration has a higher priority than the common partial sensing configuration in use.

In an exemplary embodiment, the at least one of the one or more partial sensing configurations is selected by the first UE for partial sensing, according to a selection rule based on at least one of:

an application, a service, a traffic type, a logical channel, and/or a logical channel group, that is associated with the at least one partial sensing configuration, being used by the first UE;

a priority of an application, a service, a traffic type, a logical channel, and/or a logical channel group that is associated with the at least one partial sensing configuration; or a QoS requirement of an application, a service, a traffic type, a logical channel, and/or a logical channel group that is associated with the at least one partial sensing configuration.

In an exemplary embodiment, the selection rule is configured by the node or preconfigured to the first UE.

In an exemplary embodiment, the node is a network node serving the first UE, and the one or more partial sensing configurations being received, and the selection rule being configured are implemented via same or different signaling from the network node to the first UE.

In an exemplary embodiment, the signaling includes at least one of:

system information, a paging message, a control PDU of a protocol layer,

DCI, a MAC CE, dedicated RRC signaling, or a handover command.

In an exemplary embodiment, the node is a second UE in direct communication with the first UE, and the one or more partial sensing configurations being received, and the selection rule being configured are implemented via same or different signaling from the second UE to the first UE.

In an exemplary embodiment, the signaling includes at least one of:

PC5-RRC signaling, a control PDU of a protocol layer, a MAC CE, or

SCI.

According to a third aspect of the present disclosure, a node is provided. The node includes: at least one processor, and at least one memory, storing instructions which, when executed on the at least one processor, cause the node to perform any of the methods according to the first aspect of the present disclosure.

According to a fourth aspect of the present disclosure, a UE is provided. The UE includes: at least one processor, and at least one memory, storing instructions which, when executed on the at least one processor, cause the UE to perform any of the methods according to the second aspect of the present disclosure.

According to a fifth aspect of the present disclosure, a computer readable storage medium is provided. The computer readable storage medium has computer program instructions stored thereon, the computer program instructions, when executed by at least one processor, causing the at least one processor to perform the method according to any of the first and second aspects of the present disclosure.

According to a sixth aspect of the present disclosure, a communication system is provided. The communication system includes a host computer including: processing circuitry configured to provide user data; and a communication interface configured to forward the user data to a cellular network for transmission to a UE. The cellular network includes a base station, a transmission point, relay node, or an UE having a radio interface and processing circuitry. The base station's processing circuitry is configured to perform the method according to the embodiments the present disclosure.

In an exemplary embodiment, the communication system can further include the base station.

In an exemplary embodiment, the communication system can further include the UE. The UE is configured to communicate with the base station.

In an exemplary embodiment, the processing circuitry of the host computer can be configured to execute a host application, thereby providing the user data. The UE can include processing circuitry configured to execute a client application associated with the host application.

According to a seventh aspect of the present disclosure, a method is provided. The method is implemented in a communication system including a host computer, a base station and a UE. The method includes: at the host computer, providing user data; and at the host computer, initiating a transmission carrying the user data to the UE via a cellular network including the base station. The base station can perform the method according to the embodiments of the present disclosure.

In an exemplary embodiment, the method further can include: at the base station, transmitting the user data.

In an exemplary embodiment, the user data can be provided at the host computer by executing a host application. The method can further include: at the UE, executing a client application associated with the host application.

According to an eighth aspect of the present disclosure, a communication system is provided. The communication system includes a host computer including: processing circuitry configured to provide user data; and a communication interface configured to forward user data to a cellular network for transmission to a UE. The UE includes a radio interface and processing circuitry. The UE's processing circuitry is configured to perform the method according to the first or second aspect of the present disclosure.

In an exemplary embodiment, the communication system can further include the UE.

In an exemplary embodiment, the cellular network can further include a base station configured to communicate with the UE.

In an exemplary embodiment, the processing circuitry of the host computer can be configured to execute a host application, thereby providing the user data. The UE's processing circuitry can be configured to execute a client application associated with the host application.

According to a ninth aspect of the present disclosure, a method is provided. The method is implemented in a communication system including a host computer, a base station and a UE. The method includes: at the host computer, providing user data; and at the host computer, initiating a transmission carrying the user data to the UE via a cellular network including the base station. The UE can perform the method according to the first or second aspect of the present disclosure.

In an exemplary embodiment, the method can further include: at the UE, receiving the user data from the base station.

According to a tenth aspect of the present disclosure, a communication system is provided. The communication system includes a host computer including: a communication interface configured to receive user data originating from a transmission from a UE to a base station. The UE includes a radio interface and processing circuitry. The UE's processing circuitry is configured to: perform the method according to the first or second aspect of the present disclosure.

In an exemplary embodiment, the communication system can further include the UE.

In an exemplary embodiment, the communication system can further include the base station. The base station can include a radio interface configured to communicate with the UE and a communication interface configured to forward to the host computer the user data carried by a transmission from the UE to the base station.

In an exemplary embodiment, the processing circuitry of the host computer can be configured to execute a host application. The UE's processing circuitry can be configured to execute a client application associated with the host application, thereby providing the user data.

In an exemplary embodiment, the processing circuitry of the host computer can be configured to execute a host application, thereby providing request data. The UE's processing circuitry can be configured to execute a client application associated with the host application, thereby providing the user data in response to the request data.

According to an eleventh aspect of the present disclosure, a method is provided. The method is implemented in a communication system including a host computer, a base station and a UE. The method includes: at the host computer, receiving user data transmitted to the base station from the UE. The UE can perform the method according to the first or second aspect of the present disclosure.

In an exemplary embodiment, the method can further include: at the UE, providing the user data to the base station.

In an exemplary embodiment, the method can further include: at the UE, executing a client application, thereby providing the user data to be transmitted; and at the host computer, executing a host application associated with the client application.

In an exemplary embodiment, the method can further include: at the UE, executing a client application; and at the UE, receiving input data to the client application, the input data being provided at the host computer by executing a host application associated with the client application. The user data to be transmitted is provided by the client application in response to the input data.

According to a twelfth aspect of the present disclosure, a communication system is provided. The communication system includes a host computer including a communication interface configured to receive user data originating from a transmission from a UE to a base station. The base station includes a radio interface and processing circuitry. The base station's processing circuitry is configured to perform the method according to the embodiments of the present disclosure.

In an exemplary embodiment, the communication system can further include the base station.

In an exemplary embodiment, the communication system can further include the UE. The UE can be configured to communicate with the base station.

In an exemplary embodiment, the processing circuitry of the host computer can be configured to execute a host application; the UE can be configured to execute a client application associated with the host application, thereby providing the user data to be received by the host computer.

According to a thirteen aspect of the present disclosure, a method is provided. The method is implemented in a communication system including a host computer, a base station and a UE. The method includes: at the host computer, receiving, from the base station, user data originating from a transmission which the base station has received from the UE. The base station can perform the method according to the third aspect of the present disclosure.

In an exemplary embodiment, the method can further include: at the base station, receiving the user data from the UE.

In an exemplary embodiment, the method can further include: at the base station, initiating a transmission of the received user data to the host computer.

The technical solutions of the embodiments of the present disclosure may achieve at least benefits as follows:

Enabling the UE to use most appropriate resource allocation option for SL resource allocation Mode 2 in time and effectively;

Improving service QoS satisfaction by avoiding or reducing potential resource collision;

Improving resource utilization efficiency of Mode 2 resource allocation for resource pools.

Achieving a good balance between improvement of service QoS satisfaction and improvement of UE power saving.

BRIEF DESCRIPTION OF THE DRAWINGS

The objects, advantages and characteristics of the present disclosure will be more apparent, according to descriptions of preferred embodiments in connection with the drawings, in which:

FIG. 3 schematically shows a method at a node for aligning a partial sensing configuration with a DRX configuration according to an exemplary embodiment of the present disclosure;

FIG. 4 schematically shows a method at a UE for aligning a partial sensing configuration with a DRX configuration according to an exemplary embodiment of the present disclosure;

Figure 1:
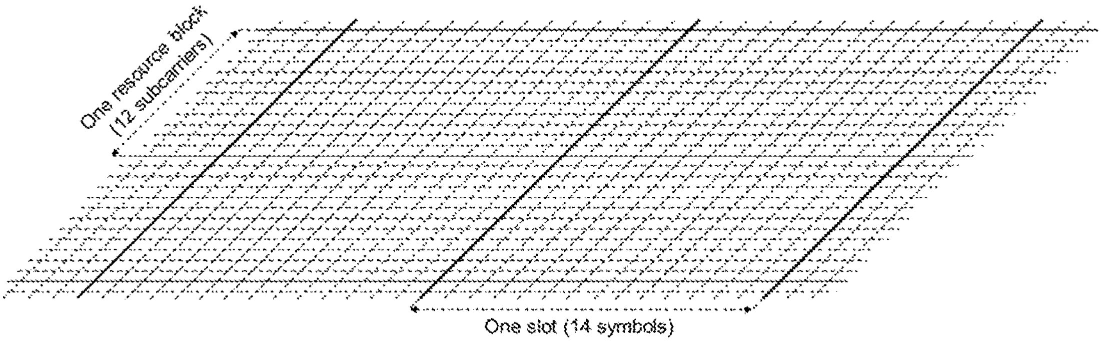
FIG. 1 schematically shows an exemplary physical resource grid used in a telecommunication system.
Figure 2A:
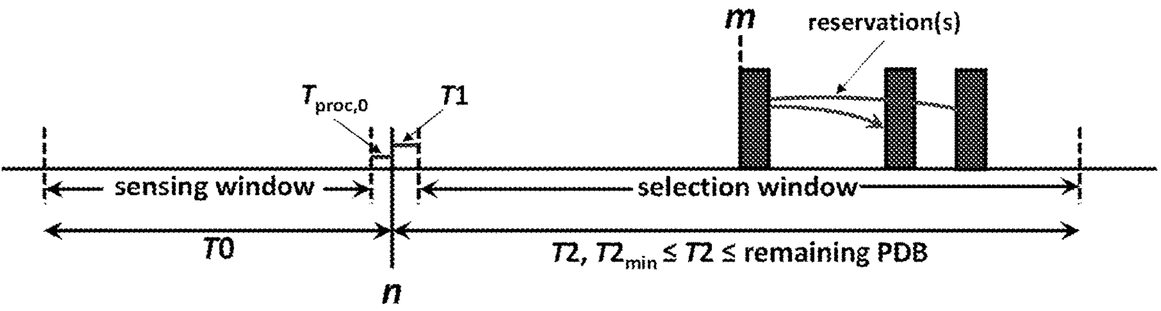
FIG. 2A schematically shows an exemplary timeline of a sensing and resource (re-)selection procedure.
Figure 2B:
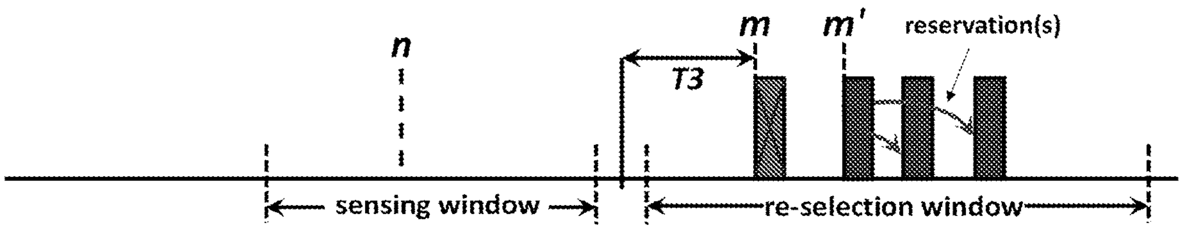
FIG. 2B schematically shows another exemplary timeline of a sensing and resource (re-)selection procedure.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Those skilled in the art will appreciate that the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "and/or" includes any and all combinations of one or more of the associated listed terms.

In the following description and claims, unless defined otherwise, all technical and scientific terms used herein have the same meaning as commonly understood by one of ordinary skills in the art to which this disclosure belongs.

As used herein, the term "network" refers to a network following any suitable (wireless or wired) communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably.

Furthermore, the communications between two devices in the network may be performed according to any suitable communication protocols, including, but not limited to, the wireless communication protocols as defined by a standard organization such as 3GPP or the wired communication protocols. For example, the wireless communication protocols may comprise the first generation (1G), 2G, 3G, 4G, 4.5G, 5G communication protocols, and/or any other protocols either currently known or to be developed in the future.

As used herein, the term "network node" refers to a device in a wireless communication network via which a terminal device or another network node accesses the network and receives services therefrom. The network node refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "UE" refers to any end device that can access a wireless communication network and receive services therefrom. By way of example and not limitation, the UE refers to a mobile terminal, terminal device, or other suitable devices. The UE may be, for example, a SS (Subscriber Station), a Portable Subscriber Station, a MS (Mobile Station), or an AT (Access Terminal), a relay node. The UE may include, but not limited to, portable computers, image capture terminal devices such as digital cameras, gaming terminal devices, music storage and playback appliances, a mobile phone, a cellular phone, a smart phone, VoIP (voice over IP) phones, wireless local loop phones, a tablet, a wearable device, a PDA (personal digital assistant), portable computers, desktop computer, image capture terminal devices such as digital cameras, gaming terminal devices, music storage and playback appliances, wearable terminal devices, vehicle-mounted wireless terminal devices, wireless endpoints, mobile stations, LEE (laptop-embedded equipment), LME (laptop-mounted equipment), USB dongles, smart devices, wireless CPE (customer-premises equipment) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an IoT (Internet of Things) scenario, a UE may represent a machine or other device that performs monitoring and/or measurements, and transmits the results of such monitoring and/or measurements to another terminal device and/or network equipment. The UE may in this case be a M2M (machine-to-machine) device, which may in a 3GPP context be referred to as a MTC device. As one particular example, the UE may be a terminal device implementing the 3GPP NB-IoT standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

The basic ideas of the present disclosure mainly consist in that 1) a plurality of partial sensing configurations may be configured to a first UE by a node, which may be a network node serving the first UE (such as gNB, eNB etc.) or by a second UE in direct communication with the first UE, or may be preconfigured to the first UE (e.g., directly written to the memory of the first UE, or hardcoded to the first UE), wherein each partial sensing configuration may be associated to a different application, service, traffic type, logical channel, and/or logical channel group; and
2) a DRX configuration and a partial sensing configuration may be configured to be aligned (or coordinated, or interacted, which may be interchanged in the present disclosure) with each other, i.e., there is a mapping relationship between the DRX configuration and the partial sensing configuration. The mapping relationship may be configured or preconfigured to the first UE in such a way that the first UE may perform partial sensing based on the partial sensing configuration at a time slot when the first UE is active according to a corresponding DRX configuration. In addition, the partial sensing configuration may also be configured to allow the first UE to sense certain time slots when the UE are inactive according to the DRX configuration. Here, the mapping relationship may have different forms, such as a one-to-one mapping, a multiple-to-one mapping, a one-to-multiple mapping between DRX configurations and partial sensing configurations.

It should be understood that the "first UE" used in the present disclosure refers to a UE to which DRX configuration(s) and partial sensing configuration(s) are configured by the node or preconfigured, i.e., referring to a configured UE; and the "second UE" used in the present disclosure refers to a UE that configures DRX configuration(s) and partial sensing configuration(s) to the "first UE", i.e., referring to a configuring UE.

The embodiments of the present disclosure will be illustratively described in the context of Sidelink transmissions (including unicast, groupcast and broadcast), such as NR Sidelink, LTE Sidelink, with SL resource allocation Mode 2, but will not be limited thereto in any way. It may be understood that the embodiments of the present disclosure are also applicable to any other technology that allows direct communication between two nearby devices (e.g., Bluetooth).

Hereinafter, a method 300 at a node for aligning a partial sensing configuration with a DRX configuration according to an exemplary embodiment of the present disclosure will be described with reference to FIG. 3. It should be understood that the node here may be a network node, such as gNB, eNB, or similar in other future developments, that serves a first UE, or may be a second UE in direct communication with the first UE.

As shown in FIG. 3, the method 300 may include at least steps S301 and S303.

In step S301, the node may generate one or more partial sensing configurations for the first UE. Additionally, the node may generate one or more DRX configurations for the first UE. The one or more partial sensing configurations may be associated/aligned with the one or more DRX configurations.

The exemplary embodiments of the present disclosure provide several implementations for aligning the DRX configurations with the partial sensing configurations.

The alignment (or coordination, or interaction) of the DRX configurations and the partial sensing configurations means that there is a mapping relationship between the DRX configuration and the partial sensing configuration. The mapping relationship may be configured or preconfigured to the first UE in such a way that the first UE may perform partial sensing based on the partial sensing configuration at a time slot when the first UE is active according to a corresponding DRX configuration. In addition, the partial sensing configuration may also be configured to allow the first UE to sense certain time slots when the UE are inactive according to the DRX configuration.

In an implementation, a DRX configuration may be generated (i.e., configured) based on at least one partial sensing configuration that is currently in use. That is, a DRX configurations may be generated (i.e., configured) in such a way that it is aligned with the at least one partial sensing configuration as much as possible. In this way, an explicit mapping relationship between the DRX configuration and the partial sensing configuration(s) is not needed. The first UE may inform the partial sensing configuration it uses to the node to assist the DRX (re)configuration of the node.

In another implementation, for a DRX configuration to be generated (or configured, or even reconfigured), at least the identification information (index or ID) of at least one corresponding partial sensing configuration may be included in the DRX configuration. In a case where there are multiple associated partial sensing configurations, e.g., a bitmap comprising multiple bits may be defined accordingly. Each bit in the bitmap corresponds to a specific partial sensing configuration. Alternatively or additionally, parts or all of the parameters in the associated partial sensing configuration(s) as previously described may be included in the DRX configuration. In this case, there may be no explicit sensing configuration RRC IE defined.

Similarly in another implementation, for a partial sensing configuration to be generated (or configured, or even reconfigured), at least the identification information (index or ID) of its associated DRX configuration(s) may be included in the partial sensing configuration. In a case where there are multiple associated DRX configurations, e.g., a bitmap comprising multiple bits may be defined accordingly. Each bit in the bitmap corresponds to a specific DRX configuration. Alternatively or additionally, parts or all of the parameters in the associated DRX configuration(s) may be included in the partial sensing configuration. In this case, there may be no explicit DRX configuration RRC IE defined.

In another implementation, the DRX configuration(s) and the partial sensing configuration(s) may be generated (or configured, or even reconfigured) separately. And a mapping relationship may be configured by linking identification information of the DRX configuration(s) to the identification information of the corresponding partial sensing configuration(s), wherein the mapping relationship is configured in such a way that the first UE can perform partial sensing based on a partial sensing configuration at a time slot when the first UE is active according to a corresponding DRX configuration. In such a case, the mapping relationship may be changed dynamically without necessarily changing the DRX configuration(s) and the partial sensing configuration(s). Then, the node may transmit the configured mapping relationship to the first UE via the same or different signaling as previously described.

Alternatively or additionally, the mapping relationship may be configured based on associated applications, services, traffic types, logical channels, and/or logical channel groups. For example, the DRX configuration(s) and partial sensing configuration(s) associated to the same applications, services, traffic types, LCHs or LCGs are mapped to each other.

The mapping rule may be configured by the node to the first UE, or preconfigured to the first UE.

As previously described, the mapping relationship may include at least one of:

- a one-to-one mapping between DRX configuration(s) and partial sensing configuration(s)
- a multiple-to-one mapping between DRX configuration(s) and partial sensing configuration(s)
- a one-to-multiple mapping between DRX configuration(s) and partial sensing configuration(s).

In an exemplary embodiment, each of the partial sensing configurations may include at least one of the following parameters:

- identification information (e.g., an index or an ID) of the partial sensing configuration
- identification information (e.g., an index or an ID) of resource pools related to the partial sensing configuration
- information of applications, services, traffic types, logical channels, and/or logical channel groups associated with the partial sensing configuration, which may include at least one of:
  - identification information of applications, services, traffic types, logical channels, and/or logical channel groups associated with the partial sensing configuration
  - priority information of applications, services, traffic types, logical channels, and/or logical channel groups associated with the partial sensing configuration
  - QoS requirement information of applications, services, traffic types, logical channels or logical channel groups other parameters related to a partial sensing operation based on the partial sensing configuration, which may include at least one of:

- a duration of a sensing window of the partial sensing operation, optionally, a lower bound value of the sensing window
- parameters indicating sensing slots of the partial sensing operation, e.g., a bitmap indicating sensing slots during the sensing window
- an indicator indicating whether partial sensing is allowed to be performed during a DRX inactive slot
- a maximum number of sensing slots during the sensing window
- a minimum number of sensing slots during the sensing window
- a periodicity defining how often periodic partial sensing should be performed, optionally, an upper bound value of the periodicity In step S303, the node may transmit, to the first UE, the one or more partial sensing configurations, at least one of which is to be used by the first UE for partial sensing. Additionally, the node may transmit, to the first UE, the one or more DRX configurations, at least one of which is to be used by the first UE for DRX.

In a case where the node configured for the first UE more than one partial sensing configuration, optionally, the method 300 may further include: activating at least one of the partial sensing configurations for use by the UE for partial sensing by transmitting, to the first UE, identification information of the at least one partial sensing configuration that needs to be activated. Optionally, the method 300 may further include: deactivating at least one of the partial sensing configurations by transmitting, to the first UE, identification information of the at least one partial sensing configuration that needs to be deactivated.

Alternatively or additionally, the method 300 may further include: configuring selection rule(s) to the first UE, indicating the first UE to select the at least one of the one or more partial sensing configurations for partial sensing based on at least one of:

- an application, a service, a traffic type, a logical channel, and/or a logical channel group, that is associated with the at least one partial sensing configuration, being used by the first UE
- a priority of an application, a service, a traffic type, a logical channel, and/or a logical channel group that is associated with the at least one partial sensing configuration
- a QoS requirement of an application, a service, a traffic type, a logical channel, and/or a logical channel group that is associated with the at least one partial sensing configuration.

For example, according to the selection rule(s), the partial sensing configuration associated to the application, service, traffic type, logical channel and/or logical channel group that is being operated by the first UE, and/or associated to the application, service, traffic type, logical channel and/or logical channel group that has the highest priority, and/or that has the highest QoS requirement should be selected by the first UE for partial sensing.

The transmitting the one or more partial sensing configurations, the activating at least one of the one or more partial sensing configurations, the deactivating at least one of the one or more partial sensing configurations, and the configuring the selection rule(s) as described above may be implemented via the same or different signaling from the node to the first UE.

In an exemplary embodiment, the node may be a network node serving the first UE, such as a serving gNB, a serving eNB, in which case, e.g., the first UE is connecting to the network node. In this exemplary embodiment, the same or different signaling for transmitting the one or more partial sensing configurations, activating/deactivating at least one of the one or more partial sensing configurations, and configuring the selection rule(s) may include at least one of:

- system information, which may provide a cell or system specific partial sensing configuration,
- a paging message, which may provide a partial sensing configuration to paged UEs,
- a control PDU of a protocol layer, such as Service Data Adaptation Protocol (SDAP), Packet Data Convergence Protocol (PDCP), Radio Link Control (RLC) or an adaptation layer (e.g., in a relay scenario),
- DCI or other L1 signaling, or a MAC CE, which may provide specific dynamic partial sensing configuration,
- dedicated RRC signaling, which may provide specific dynamic partial sensing configuration,
- a handover command, e.g., RRCReconfigurationWithsync, which may provide specific dynamic partial sensing configuration, in which case the serving network node is the target network node in the target cell.

In another exemplary embodiment, the node may be a second UE (e.g., a coordinator UE) in direct communication with the first UE. In this exemplary embodiment, the same or different signaling for transmitting the one or more partial sensing configurations, activating/deactivating at least one of the one or more partial sensing configurations, and configuring the selection rule(s) may include at least one of:

- PC5-RRC signaling,
- a control PDU of a protocol layer, such as SDAP, PDCP, RLC or an adaptation layer (e.g., in a relay scenario),
- a MAC CE, or
- SCI or other L1 signaling.

In a case where the first UE is not connecting to any (SL capable) node, the partial sensing configurations, and/or the selection rule(s) may be preconfigured to the first UE (e.g., directly written to the memory of the first UE, or hardcoded to the first UE).

In an exemplary embodiment, the one or more partial sensing configurations may include at least one of:

- a common partial sensing configuration applicable to all applications, services, traffic types, logical channels, and/or logical channel groups of the first UE per resource pool, or
- a dedicated partial sensing configuration applicable to specific applications, services, traffic types, logical channels, and/or logical channel groups of the first UE.

The common partial sensing configuration may be associated with at least one resource pool. For example, the common partial sensing configuration may be configured/preconfigured per resource pool. In a case where the first UE is configured with the common partial sensing configuration, the first UE uses the same common partial sensing configuration for whatever data to perform transmissions using the associated resource pools.

The dedicated partial sensing configuration may be associated with at least one resource pool. In a case where the first UE is configured with the common partial sensing configuration, the first UE uses the dedicated partial sensing configuration to perform transmission for the specific applications, services, traffic types, logical channels, and/or logical channel groups.

When both the common partial sensing configuration and the dedicated partial sensing configuration(s) specific for certain applications, services, traffic types, logical channels, and/or logical channel groups are configured, the dedicated partial sensing configuration(s) may have a higher priority than the common partial sensing configuration in use.

Hereinafter, a method 400 at the first UE for aligning a partial sensing configuration with a DRX configuration according to an exemplary embodiment of the present disclosure will be described with reference to FIG. 4. It should be understood that the method 400 at the first UE corresponds to the method 300 at the node as previously described. Thus, some description of the method 400 may refer to that of method 300, and thus will be omitted for simplicity.

As shown in FIG. 4, the method 400 may include at least steps S401 and S403.

In step S401, the first UE may obtain one or more partial sensing configurations for the first UE. Additionally, the first UE may obtain one or more DRX configurations for the first UE. The one or more partial sensing configurations may be associated/aligned with the one or more DRX configurations.

As previously described, the exemplary embodiments of the present disclosure provide several implementations for aligning the DRX configurations with the partial sensing configurations.

In an implementation, a DRX configuration may be configured to the first UE based on at least one partial sensing configuration that is currently in use. The first UE may inform the partial sensing configuration it uses to the node to assist the DRX (re)configuration of the node in such a way that it is aligned with the at least one partial sensing configuration as much as possible.

In another implementation, for a DRX configuration obtained, at least the identification information (index or ID) of at least one corresponding partial sensing configuration may be included in the DRX configuration. In a case where there are multiple associated partial sensing configurations, e.g., a bitmap comprising multiple bits may be defined accordingly. Each bit in the bitmap corresponds to a specific partial sensing configuration. Alternatively or additionally, parts or all of the parameters in the associated partial sensing configuration(s) as previously described may be included in the DRX configuration. In this case, there may be no explicit sensing configuration RRC IE defined.

Similarly in another implementation, for a partial sensing configuration obtained, at least the identification information (index or ID) of its associated DRX configuration(s) may be included in the partial sensing configuration. In a case where there are multiple associated DRX configurations, e.g., a bitmap comprising multiple bits may be defined accordingly. Each bit in the bitmap corresponds to a specific DRX configuration. Alternatively or additionally, parts or all of the parameters in the associated DRX configuration(s) may be included in the partial sensing configuration. In this case, there may be no explicit DRX configuration RRC IE defined.

In another implementation, the DRX configuration(s) and the partial sensing configuration(s) may be obtained separately. And a mapping relationship may be obtained which links identification information of the DRX configuration(s) to the identification information of the corresponding partial sensing configuration(s), wherein the mapping relationship is configured by the node or is preconfigured to the first UE in such a way that the first UE can perform partial sensing based on a partial sensing configuration at a time slot when the first UE is active according to a corresponding DRX configuration. In such a case, the mapping relationship may be changed dynamically without necessarily changing the DRX configuration(s) and the partial sensing configuration(s). Then, the first UE may receive the configured mapping relationship to the first UE via the same or different signaling as previously described.

Alternatively or additionally, the mapping relationship may be configured or preconfigured based on associated applications, services, traffic types, logical channels, and/or logical channel groups. For example, the DRX configuration(s) and partial sensing configuration(s) associated to the same applications, services, traffic types, LCHs or LCGs are mapped to each other.

The mapping rule may be configured by the node to the first UE, or preconfigured to the first UE.

As previously described, the mapping relationship may include at least one of:

- a one-to-one mapping between DRX configuration(s) and partial sensing configuration(s)
- a multiple-to-one mapping between DRX configuration(s) and partial sensing configuration(s)
- a one-to-multiple mapping between DRX configuration(s) and partial sensing configuration(s).

As previously described, each of the partial sensing configurations may include at least one of the following parameters:

- identification information (e.g., an index or an ID) of the partial sensing configuration
- identification information (e.g., an index or an ID) of resource pools related to the partial sensing configuration
- information of applications, services, traffic types, logical channels, and/or logical channel groups associated with the partial sensing configuration, which may include at least one of:
  - identification information of applications, services, traffic types, logical channels, and/or logical channel groups associated with the partial sensing configuration
  - priority information of applications, services, traffic types, logical channels, and/or logical channel groups associated with the partial sensing configuration
  - QoS requirement information of applications, services, traffic types, logical channels or logical channel groups
- other parameters related to a partial sensing operation based on the partial sensing configuration, which may include at least one of:
  - a duration of a sensing window of the partial sensing operation, optionally, a lower bound value of the sensing window
  - parameters indicating sensing slots of the partial sensing operation, e.g., a bitmap indicating sensing slots during the sensing window
  - an indicator indicating whether partial sensing is allowed to be performed during a DRX inactive slot
  - a maximum number of sensing slots during the sensing window
  - a minimum number of sensing slots during the sensing window
  - a periodicity defining how often periodic partial sensing should be performed, optionally, an upper bound value of the periodicity In step S403, the first UE may perform partial sensing based on at least one of the one or more partial sensing configurations. Additionally or alternatively, the first UE may perform partial sensing based on at least one of the one or more DRX configurations.

In an exemplary embodiment, the at least one of the one or more partial sensing configurations may be selected by the first UE for partial sensing, according to selection rule(s) based on at least one of:

- an application, a service, a traffic type, a logical channel, and/or a logical channel group, that is associated with the at least one partial sensing configuration, being used by the first UE
- a priority of an application, a service, a traffic type, a logical channel, and/or a logical channel group that is associated with the at least one partial sensing configuration
- a QoS requirement of an application, a service, a traffic type, a logical channel, and/or a logical channel group that is associated with the at least one partial sensing configuration.

For example, according to the selection rule(s), the partial sensing configuration associated to the application, service, traffic type, logical channel and/or logical channel group that is being operated by the first UE, and/or associated to the application, service, traffic type, logical channel and/or logical channel group that has the highest priority, and/or that has the highest QoS requirement should be selected by the first UE for partial sensing.

As previously described, the selection rule(s) may be configured by the node or preconfigured to the first UE.

In an exemplary embodiment, a sensing periodicity used by the first UE should not be longer than the corresponding upper bound value in the used partial sensing configuration.

In an exemplary embodiment, a sensing window duration used by the first UE should not be shorter than the corresponding lower bound value in the used partial sensing configuration.

The one or more partial sensing configurations being received, and the selection rule being configured and received are implemented via same or different signaling from the network node to the first UE.

In an exemplary embodiment, the node may be a network node serving the first UE, such as a serving gNB, a serving eNB, in which case, e.g., the first UE is connecting to the network node. In this exemplary embodiment, the same or different signaling for receiving the one or more partial sensing configurations and the selection rule(s) may include at least one of:

- system information, which may provide a cell or system specific partial sensing configuration,
- a paging message, which may provide a partial sensing configuration to paged UEs,
- a control PDU of a protocol layer, such as Service Data Adaptation Protocol (SDAP), Packet Data Convergence Protocol (PDCP), Radio Link Control (RLC) or an adaptation layer (e.g., in a relay scenario),
- DCI or other L1 signaling, or a MAC CE, which may provide specific dynamic partial sensing configuration,
- dedicated RRC signaling, which may provide specific dynamic partial sensing configuration,
- a handover command, e.g., RRCReconfigurationWithsync, which may provide specific dynamic partial sensing configuration, in which case the serving network node is the target network node in the target cell.

In another exemplary embodiment, the node may be a second UE (e.g., a coordinator UE) in direct communication with the first UE. In this exemplary embodiment, the same or different signaling for receiving the one or more partial sensing configurations and the selection rule(s) may include at least one of:

- PC5-RRC signaling,
- a control PDU of a protocol layer, such as SDAP, PDCP, RLC or an adaptation layer (e.g., in a relay scenario),
- a MAC CE, or
- SCI or other L1 signaling.

In a case where the first UE is not connecting to any (SL capable) node, the partial sensing configurations, and/or the selection rule(s) may be preconfigured to the first UE (e.g., directly written to the memory of the first UE, or hardcoded to the first UE).

In an exemplary embodiment, the one or more partial sensing configurations may include at least one of:

- a common partial sensing configuration applicable to all applications, services, traffic types, logical channels, and/or logical channel groups of the first UE per resource pool, or
- a dedicated partial sensing configuration applicable to specific applications, services, traffic types, logical channels, and/or logical channel groups of the first UE.

The common partial sensing configuration may be associated with at least one resource pool. For example, the common partial sensing configuration may be configured/preconfigured per resource pool. In a case where the first UE is configured with the common partial sensing configuration, the first UE uses the same common partial sensing configuration for whatever data to perform transmissions using the associated resource pools.

The dedicated partial sensing configuration may be associated with at least one resource pool. In a case where the first UE is configured with the common partial sensing configuration, the first UE uses the dedicated partial sensing configuration to perform transmission for the specific applications, services, traffic types, logical channels, and/or logical channel groups.

When both the common partial sensing configuration and the dedicated partial sensing configuration(s) specific for certain applications, services, traffic types, logical channels, and/or logical channel groups are configured, the dedicated partial sensing configuration(s) may have a higher priority than the common partial sensing configuration in use.

In an exemplary embodiment, whether or not partial sensing is performed outside the DRX active time is determined by the first UE according to specific rules which may be configured or preconfigured to the UE. For example, if a battery life of the first UE is above a certain (pre-)configured threshold, it performs partial sensing outside the DRX active time. Another exemplary rule may be if the CBR of the system is high (i.e. channel is congested), the first UE may perform partial sensing outside the DRX active time; otherwise, it just performs partial sensing during DRX active time.

In an exemplary embodiment, the first UE may be configured with one or multiple partial sensing configurations. For services/traffic types with critical QoS requirements (e.g., short delay requirement and/or high transmission reliability), the first UE may use a partial sensing configuration which allows the first UE to sense more often than the services with non-critical QoS requirements. If the used partial sensing configuration allows, the first UE may also sense slots even when the first UE is inactive according to the DRX configuration. While for services/traffic types with non-critical QoS requirements (e.g., long delay requirement and/or low transmission reliability), the first UE may use a partial sensing configuration which allows the first UE to sense less often than the services with critical QoS requirements. The partial sensing configuration may not allow the UE to sense the slots when the UE is inactive according to the DRX configuration.

In an exemplary embodiment, when the first UE hands over from a serving cell to a target cell, the target cell provides one or multiple DRX configurations and/or one or multiple partial sensing configurations to the first UE. Upon reception of the signaling as previously described, the first UE uses the appropriate partial sensing configuration(s) to perform partial sensing during the handover procedure. As previously described, the partial sensing configurations are signaled to the first UE in the handover command, e.g., RRC ReconfigurationWithsync.

In an exemplary embodiment, for the first UE configured with both the DRX configuration(s) and the partial sensing configuration(s), there may be only one DRX configuration active at a time. When the first UE selects to use a different DRX configuration in an upper layer (e.g., the MAC layer), the partial sensing configuration to be used will be also different due to the mapping relationship between the DRX configuration(s) and the partial sensing configuration(s). Thus, the upper layer may determine a corresponding partial sensing configuration based on the mapping relationship, and inform a lower layer (e.g., the physical layer) of the corresponding partial sensing configuration.

In an exemplary embodiment, for the first UE configured with both the DRX configuration(s) and the partial sensing configuration(s), the first UE may use multiple configurations at the same time. When the first UE builds up a PDU/TB of an upper layer (e.g., a new MAC PDU/TB) that contains data related to a single or multiple applications, services, traffic types, logical channels, and/or logical channel groups, the upper layer (e.g., the MAC layer) may determine DRX configuration(s) associated with the application(s), the service(s), the traffic type(s), the logical channel(s), and/or the logical channel group(s) based on the PDU. Then, the upper layer may further determine corresponding partial sensing configuration(s) based on the mapping relationship, and inform the lower layer (e.g., the physical layer) of the corresponding partial sensing configuration(s). Accordingly, the lower layer may perform partial sensing according to the received partial sensing configuration(s).

In an exemplary embodiment, for the first UE configured with both the DRX configuration(s) and the partial sensing configuration(s), there may be no explicit mapping between DRX configuration(s) and partial sensing configuration(s). Instead, when the first UE builds up a PDU/TB of an upper layer (e.g., a new MAC PDU/TB) that contains data related to a single or multiple applications, services, traffic types, logical channels, and/or logical channel groups, the upper layer (e.g., the MAC layer) may inform the lower layer (e.g., the physical layer) of information on the application(s), the service(s), the traffic type(s), the logical channel(s), and/or the logical channel group(s). Then, the lower layer may determine corresponding partial sensing configuration(s)/parameters, i.e., select configuration(s) from the set of configurations which are already configured/preconfigured. Accordingly, the lower layer may perform partial sensing according to the determined partial sensing configuration(s).

In an exemplary embodiment, whether partial sensing is performed during a DRX inactive slot is determined by the first UE according to a specific rule that is configured by the node or is preconfigured to the first UE.

In an exemplary embodiment, the partial sensing configuration(s) may be obtained by receiving the partial sensing configuration(s) from the node, or by preconfiguration. Similarly, the one or more DRX configurations may be obtained by receiving the one or more DRX configuration(s) from the node, or by preconfiguration.

Figure 5:
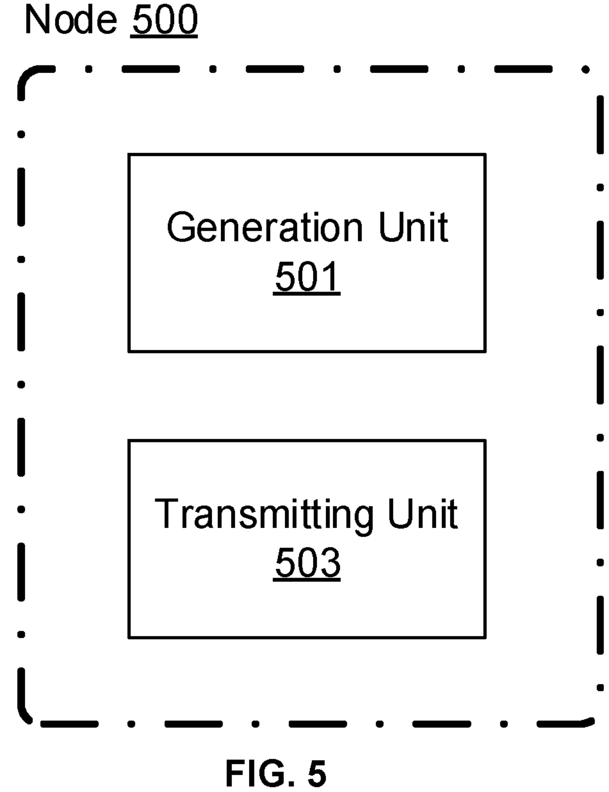
FIG. 5 schematically shows a structural block diagram of a node according to an exemplary embodiment of the present disclosure.

Hereinafter, a structure of a node according to an exemplary embodiment of the present disclosure will be described with reference to FIG. 5. FIG. 5 schematically shows a block diagram of the node 500 according to an exemplary embodiment of the present disclosure. The node 500 in FIG. 5 may perform the method 300 as described previously with reference to FIG. 3. Accordingly, some detailed description on the node 500 may refer to the corresponding description of the method 300 in FIG. 3, and thus will be omitted here for simplicity.

As shown in FIG. 5, the node 500 may include a generation unit 501 and a transmitting unit 503.

The generation unit 501 may be configured to generate one or more partial sensing configurations and one or more DRX configurations for the first UE.

The transmitting unit 503 may be configured to transmit, to the first UE, the one or more partial sensing configurations, at least one of which is to be used by the first UE for partial sensing, and the one or more DRX configurations, at least one of which is to be used by the first UE for DRX, wherein the one or more partial sensing configurations are associated with the one or more DRX configurations.

In an exemplary embodiment, the generation unit 501 generates the one or more DRX configurations based on at least one partial sensing configuration that is currently in use.

There is a mapping relationship between the one or more DRX configurations and the one or more partial sensing configurations, and the mapping relationship enables the first UE to perform partial sensing based on a partial sensing configuration at a time slot when the first UE is active according to a corresponding DRX configuration.

At least identification information of at least one corresponding partial sensing configuration may be included in each of the one or more DRX configurations, or at least identification information of at least one corresponding DRX configuration may be included in each of the one or more partial sensing configurations.

In an exemplary embodiment, the generation unit 501 may be further configured to generate a mapping relationship by linking identification information of the one or more DRX configurations to the identification information of the one or more corresponding partial sensing configurations, wherein the mapping relationship is configured in such a way that the first UE can perform partial sensing based on a partial sensing configuration at a time slot when the first UE is active according to a corresponding DRX configuration. Then, the transmitting unit 503 may be further configured to transmitting the configured mapping relationship to the first UE.

In an exemplary embodiment, the node 500 may further include an activation/deactivation unit (not shown), which may be configured to activate/deactivate at least one of the one or more partial sensing configurations for use by the UE for partial sensing.

In an exemplary embodiment, the generation unit 501 may be further configured to generate a selection rule to the first UE, indicating the first UE to select the at least one of the one or more partial sensing configurations for partial sensing based on at least one of:

an application, a service, a traffic type, a logical channel, and/or a logical channel group, that is associated with the at least one partial sensing configuration, being used by the first UE;

a priority of an application, a service, a traffic type, a logical channel, and/or a logical channel group that is associated with the at least one partial sensing configuration; or a QoS requirement of an application, a service, a traffic type, a logical channel, and/or a logical channel group that is associated with the at least one partial sensing configuration.

As previously described, the node 500 may be a network node serving the first UE, or a second UE in direct communication with the first UE.

Figure 6:
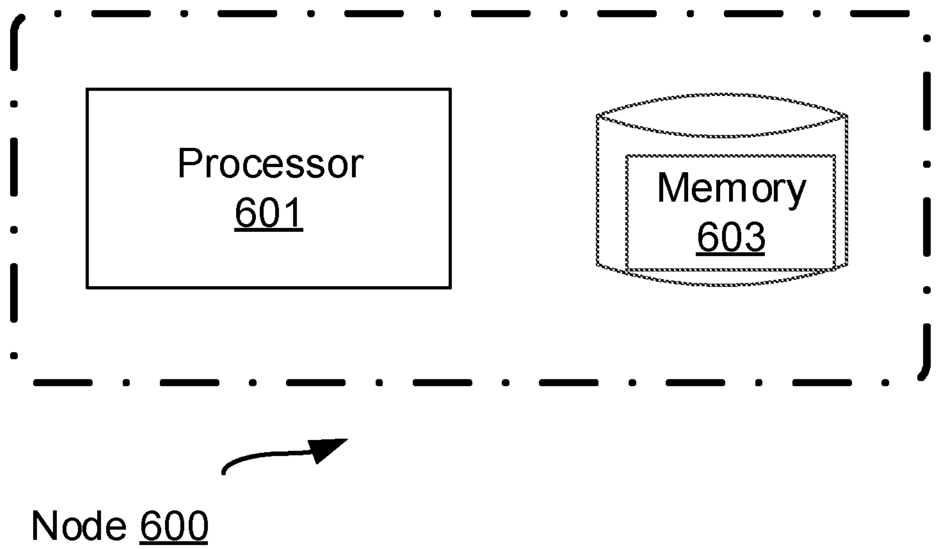
FIG. 6 schematically shows a structural block diagram of a node according to another exemplary embodiment of the present disclosure.

Hereinafter, a structure of a node according to another exemplary embodiment of the present disclosure will be described with reference to FIG. 6. FIG. 6 schematically shows a block diagram of a node 600 according to an exemplary embodiment of the present disclosure. The node 600 in FIG. 6 may perform the method 300 as described previously with reference to FIG. 3. Accordingly, some detailed description on the node 600 may refer to the corresponding description of the method 300 in FIG. 3, and thus will be omitted here for simplicity.

As shown in FIG. 6, the node 600 includes at least one processor 601 and at least one memory 603. The at least one processor 601 includes e.g., any suitable CPU (Central Processing Unit), microcontroller, DSP (Digital Signal Processor), etc., capable of executing computer program instructions. The at least one memory 603 may be any combination of a RAM (Random Access Memory) and a ROM (Read Only Memory). The at least one processor memory 603 may also include persistent storage, which, for example, can be any single one or combination of magnetic memory, optical memory, or solid state memory or even remotely mounted memory.

The at least one memory 603 stores instructions executable by the at least one processor 601. The instructions, when loaded from the at least one memory 603 and executed on the at least one processor 601, may cause the node 600 to perform the actions, e.g., of the procedures as described earlier respectively in conjunction with FIG. 3, and thus will be omitted here for simplicity.

Figure 7:
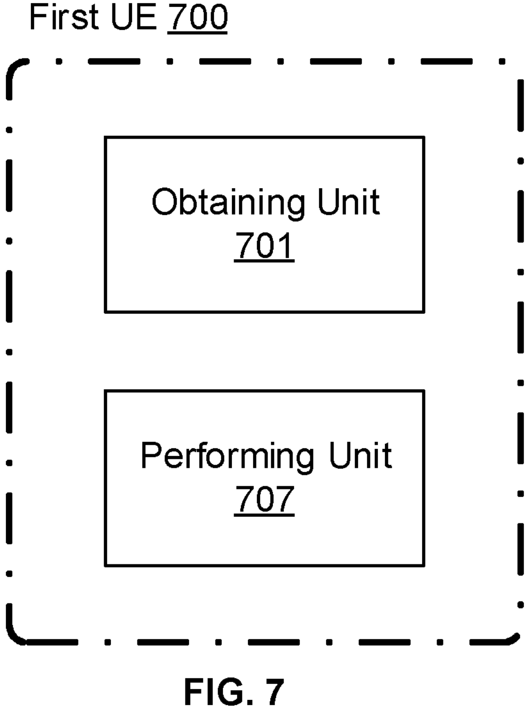
FIG. 7 schematically shows a structural block diagram of a UE according to an exemplary embodiment of the present disclosure.

Hereinafter, a structure of a first UE according to an exemplary embodiment of the present disclosure will be described with reference to FIG. 7. FIG. 7 schematically shows a block diagram of the first UE 700 according to an exemplary embodiment of the present disclosure. The first UE 700 in FIG. 7 may perform the method 400 as described previously with reference to FIG. 4. Accordingly, some detailed description on the first UE 700 may refer to the corresponding description of the method 400 in FIG. 4, and thus will be omitted here for simplicity.

As shown in FIG. 7, the first UE 700 may include an obtaining unit 701 and a performing unit 703.

The obtaining unit 701 may be configured to obtain one or more partial sensing configurations and one or more DRX configurations for the first UE, wherein the one or more partial sensing configurations may be associated with the one or more DRX configurations.

The performing unit 703 may be configured to perform partial sensing based on at least one of the one or more partial sensing configurations and/or DRX based on at least one of the one or more DRX configurations.

In an exemplary embodiment, the obtaining unit 701 may obtain the one or more DRX configurations based on at least one partial sensing configuration that is currently in use.

There is a mapping relationship between the one or more DRX configurations and the one or more partial sensing configurations, and the mapping relationship enables the first UE to perform partial sensing based on a partial sensing configuration at a time slot when the first UE is active according to a corresponding DRX configuration.

At least identification information of at least one corresponding partial sensing configuration may be included in each of the one or more DRX configurations, or at least identification information of at least one corresponding DRX configuration may be included in each of the one or more partial sensing configurations.

In an exemplary embodiment, the obtaining unit 701 may be further configured to obtain a mapping relationship which links identification information of the one or more DRX configurations to the identification information of the one or more corresponding partial sensing configurations, wherein the mapping relationship is configured by the node or is preconfigured to the first UE in such a way that the first UE can perform partial sensing based on a partial sensing configuration at a time slot when the first UE is active according to a corresponding DRX configuration.

In an exemplary embodiment, the obtaining unit 701 may be further configured to obtain a selection rule based on at least one of:

an application, a service, a traffic type, a logical channel, and/or a logical channel group, that is associated with the at least one partial sensing configuration, being used by the first UE;

a priority of an application, a service, a traffic type, a logical channel, and/or a logical channel group that is associated with the at least one partial sensing configuration; or a QoS requirement of an application, a service, a traffic type, a logical channel, and/or a logical channel group that is associated with the at least one partial sensing configuration.

The first UE 700 may further include a selection unit (not shown), which may be configured to select the at least one of the one or more partial sensing configurations for partial sensing, according to the selection rule.

Figure 8:
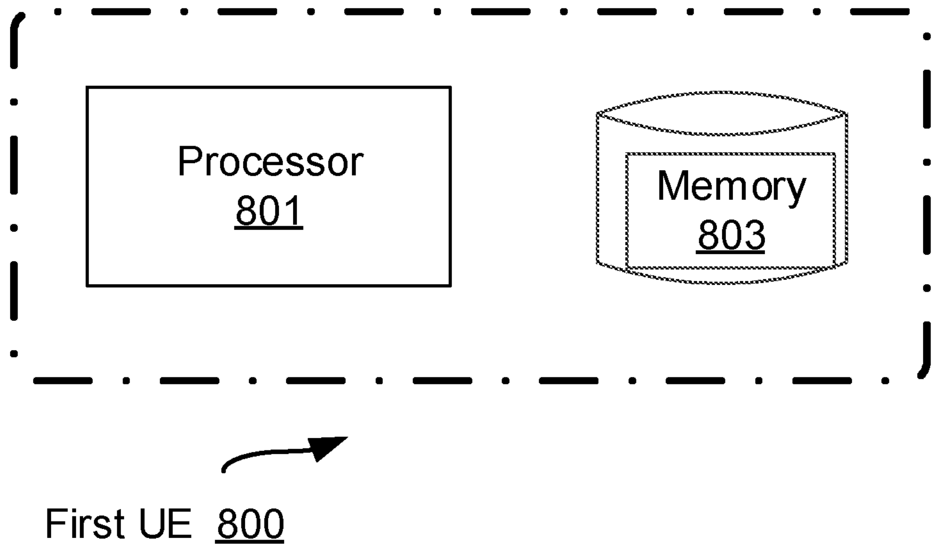
FIG. 8 schematically shows a structural block diagram of a UE according to another exemplary embodiment of the present disclosure.

Hereinafter, a structure of a first UE according to another exemplary embodiment of the present disclosure will be described with reference to FIG. 8. FIG. 8 schematically shows a block diagram of a first UE 800 according to an exemplary embodiment of the present disclosure. The first UE 800 in FIG. 8 may perform the method 400 as described previously with reference to FIG. 4. Accordingly, some detailed description on the first UE 800 may refer to the corresponding description of the method 400 in FIG. 4, and thus will be omitted here for simplicity.

As shown in FIG. 8, the first UE 800 includes at least one processor 801 and at least one memory 803. The at least one processor 801 includes e.g., any suitable CPU (Central Processing Unit), microcontroller, DSP (Digital Signal Processor), etc., capable of executing computer program instructions. The at least one memory 803 may be any combination of a RAM (Random Access Memory) and a ROM (Read Only Memory). The at least one processor memory 803 may also include persistent storage, which, for example, can be any single one or combination of magnetic memory, optical memory, or solid state memory or even remotely mounted memory.

The at least one memory 803 stores instructions executable by the at least one processor 801. The instructions, when loaded from the at least one memory 803 and executed on the at least one processor 801, may cause the first UE 800 to perform the actions, e.g., of the procedures as described earlier respectively in conjunction with FIG. 4, and thus will be omitted here for simplicity.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program.

The computer program includes: code/computer readable instructions, which when executed by the at least one processor 601 causes the node 600 to perform the actions, e.g., of the procedure described earlier in conjunction with FIG. 3; or code/computer readable instructions, which when executed by the at least one processor 801 causes the first UE 800 to perform the actions, e.g., of the procedures described earlier respectively in conjunction with FIG. 4.

The computer program product may be configured as a computer program code structured in computer program modules. The computer program modules could essentially perform the actions of the flow illustrated in any of FIGS. 3 to 4.

The processor may be a single CPU (Central processing unit), but could also include two or more processing units. For example, the processor may include general purpose microprocessors; instruction set processors and/or related chips sets and/or special purpose microprocessors such as Application Specific Integrated Circuit (ASICs). The processor may also include board memory for caching purposes. The computer program may be carried by a computer program product connected to the processor. The computer program product may include a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 9:
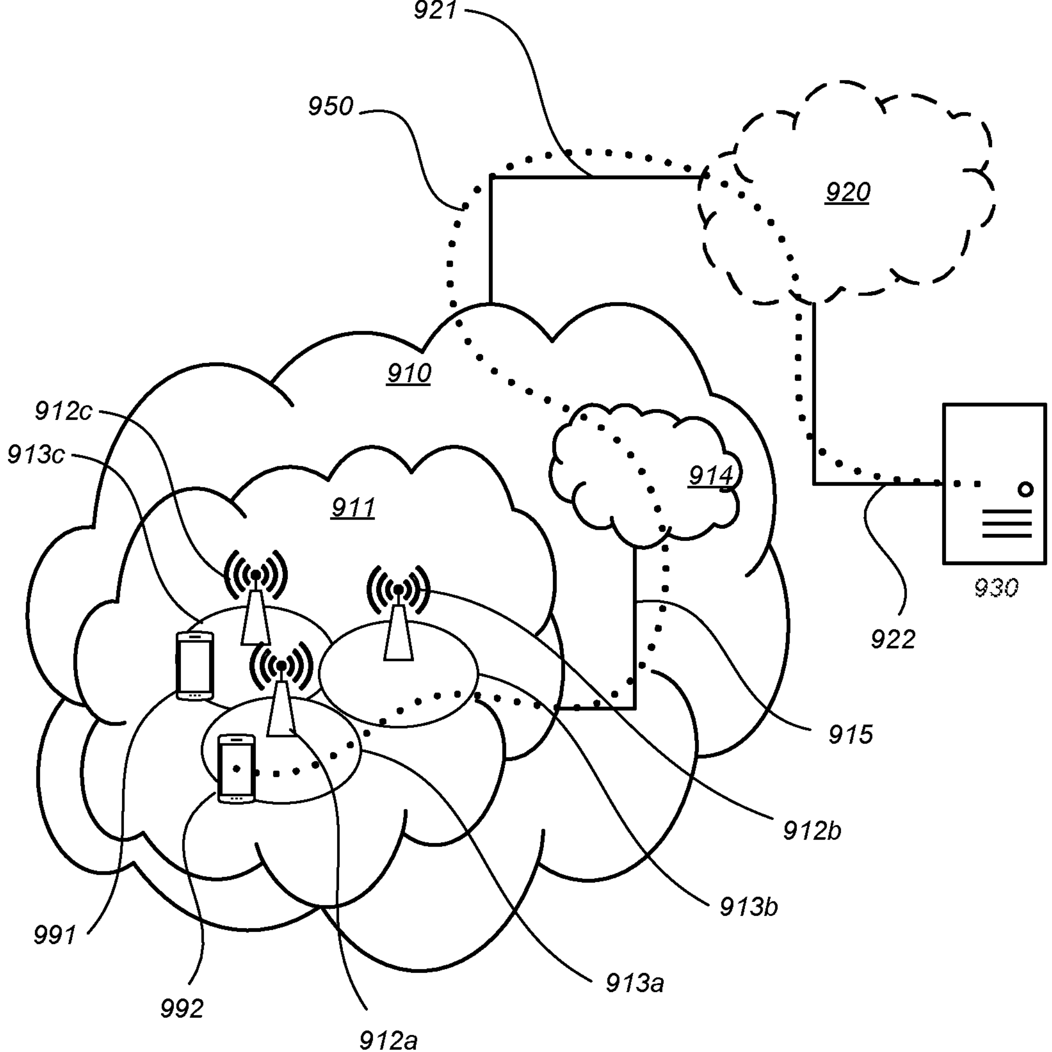
FIG. 9 schematically illustrates a telecommunication network connected via an intermediate network to a host computer.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912*a*, 912*b*, 912*c*, such as NBs, eNBs, gNBs or other types of wireless access points, each defining a corresponding coverage area 913*a*, 913*b*, 913*c*. Each base station 912*a*, 912*b*, 912*c* is connectable to the core network 914 over a wired or wireless connection 915. A first user equipment (UE) 991 located in coverage area 913*c* is configured to wirelessly connect to, or be paged by, the corresponding base station 912*c*. A second UE 992 in coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 108, which is stored in or accessible by the host computer 1010 and executable by the processing circuitry 1018. The software 108 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
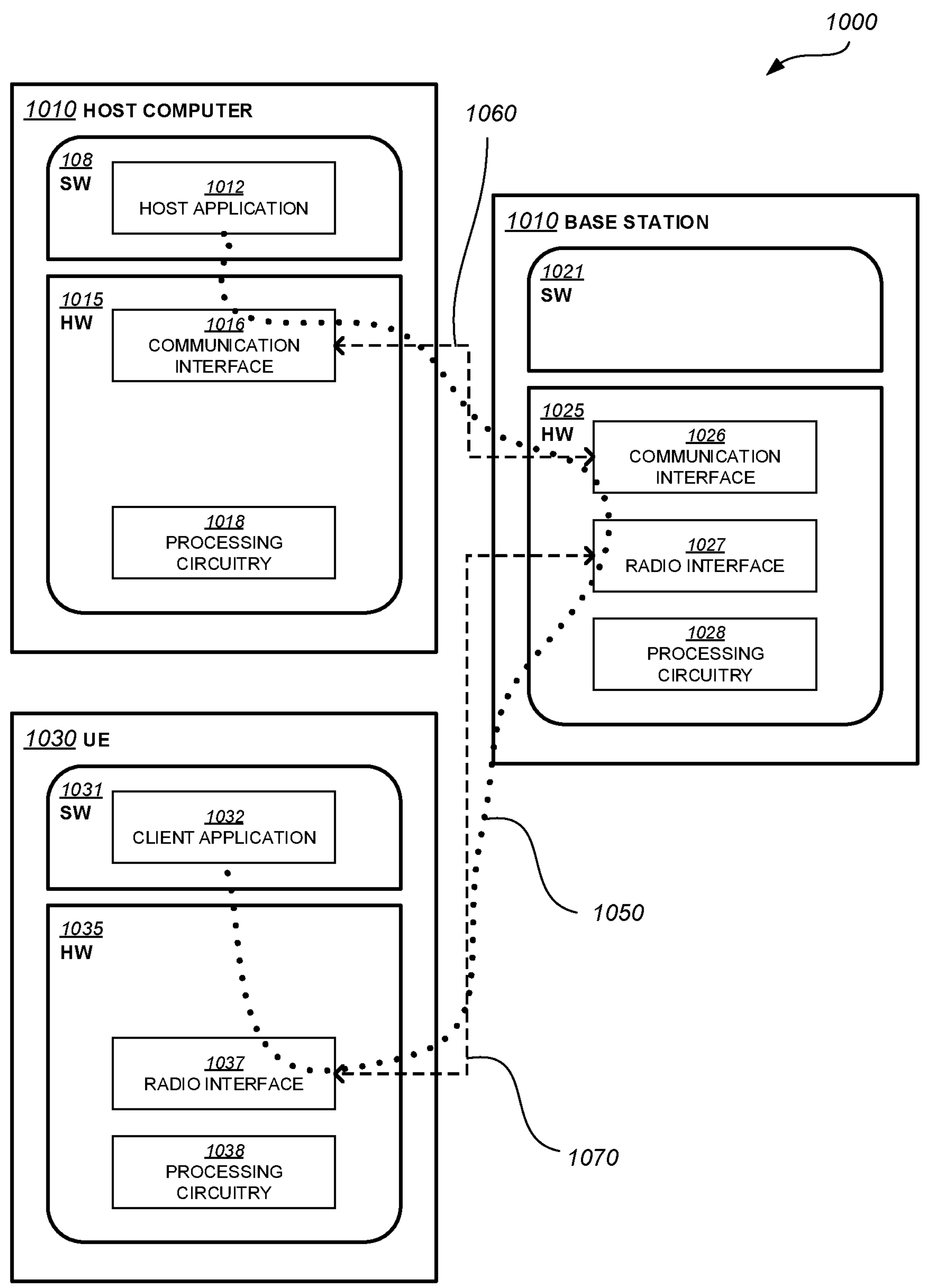
FIG. 10 is a generalized block diagram of a host computer communicating via a base station with a UE over a partially wireless connection.

It is noted that the host computer 1010, base station 1020 and UE 1030 illustrated in FIG. 10 may be identical to the host computer 1030, one of the base stations 912*a*, 912*b*, 912*c* and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may reduce PDCCH detection time and complexity and thereby provide benefits such as reduced user waiting time and reduced power consumption at the UE.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 108 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 108, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 108, 1031 causes messages to be transmitted, in particular empty or 'dummy' messages, using the OTT connection 1050 while it monitors propagation times, errors etc.

Figures 11, 12:
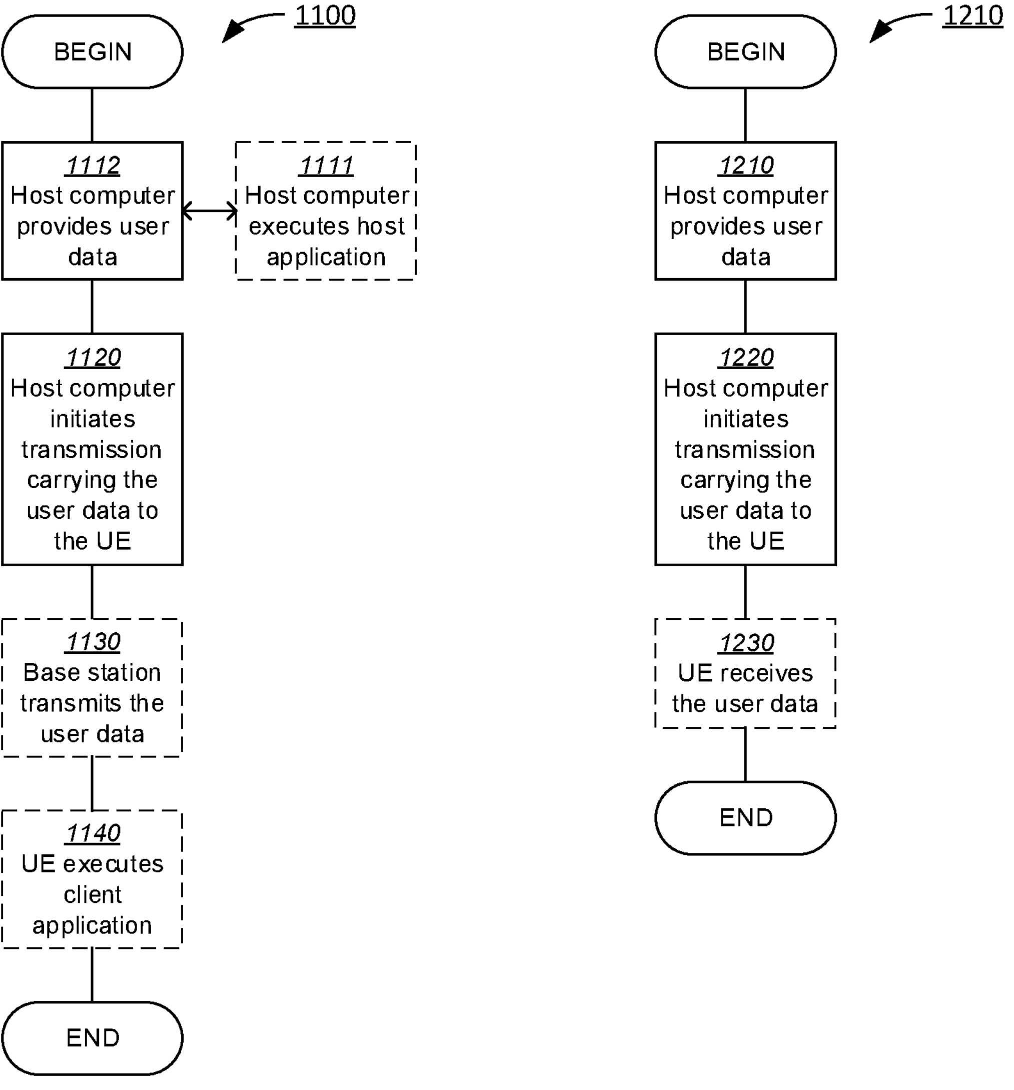
FIGS. 11 to 14 are flowcharts illustrating methods implemented in a communication system including a host computer, a base station and a UE.

FIG. 11 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 12. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figures 13, 14:
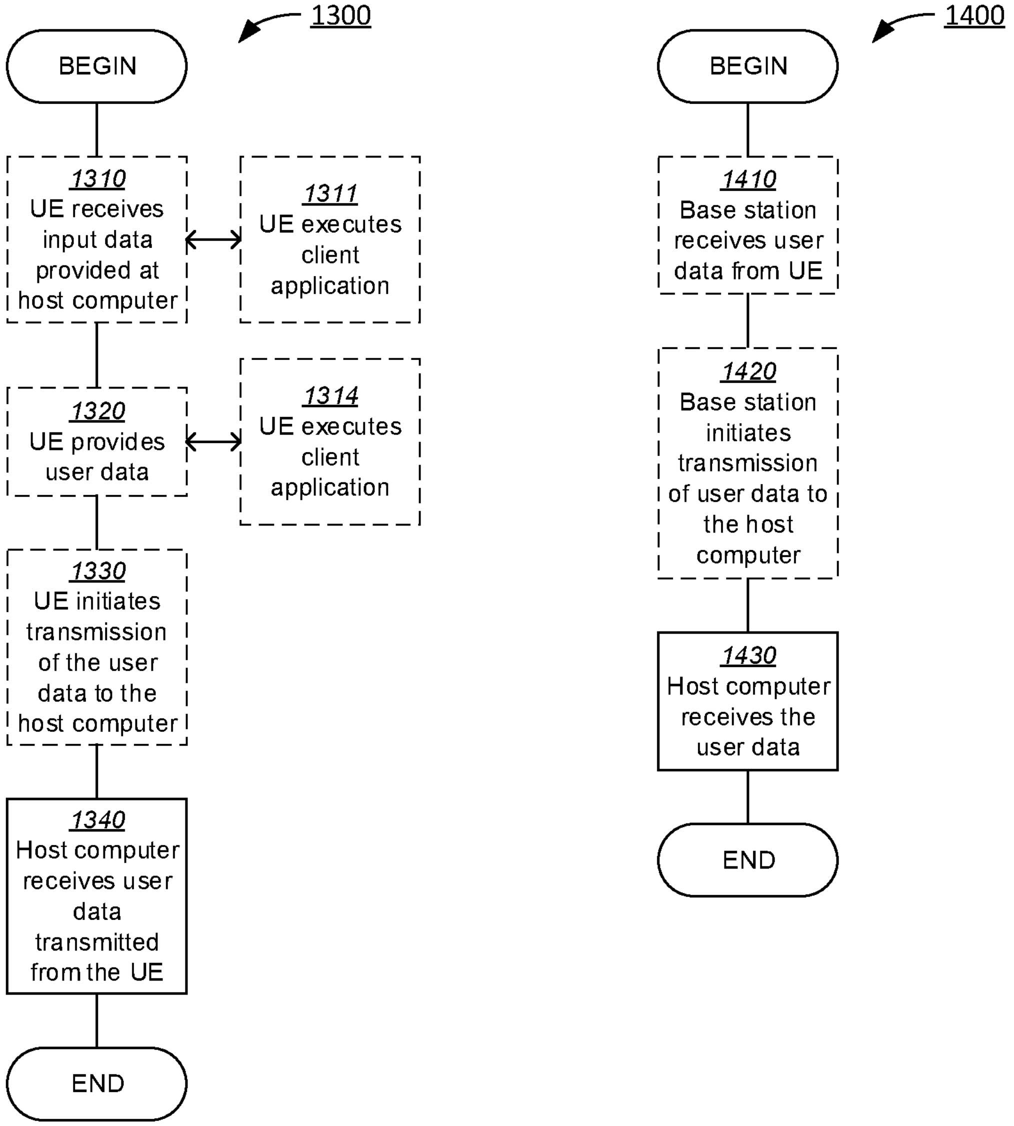

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally or alternatively, in an optional second step 1313, the UE provides user data. In an optional substep 1321 of the second step 1313, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

The present disclosure has been described above with reference to embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

The invention claimed is:

1. A method, implemented by a node, the method comprising:
- generating one or more partial sensing configurations and one or more Discontinuous Reception (DRX) configurations for a first User Equipment (UE); and
- transmitting, to the first UE, the one or more partial sensing configurations, at least one of which is to be used by the first UE for partial sensing, and the one or more DRX configurations, at least one of which is to be used by the first UE for DRX, wherein the one or more partial sensing configurations comprise parameters related to a partial sensing operation based on the partial sensing configuration, and wherein the one or more DRX configurations are generated based on at least one partial sensing configuration that is currently in use such that the one or more partial sensing configurations are associated with the one or more DRX configurations.

2. The method of claim 1, wherein the parameters related to the partial sensing operation based on the partial sensing configuration comprise an indicator indicating whether partial sensing is allowed to be performed during a DRX inactive slot.

3. The method of claim 1, wherein the partial sensing configuration further comprises at least one of:
- identification information of the partial sensing configuration;
- identification information of resource pools related to the partial sensing configuration; or
- information of applications, services, traffic types, logical channels, and/or logical channel groups associated with the partial sensing configuration.

4. The method of claim 3, wherein the information of applications, services, traffic types, logical channels, and/or logical channel groups associated with the partial sensing configuration comprises at least one of:
- identification information of applications, services, traffic types, logical channels, and/or logical channel groups associated with the partial sensing configuration;
- priority information of applications, services, traffic types, logical channels, and/or logical channel groups associated with the partial sensing configuration; or
- Quality of Service (QOS) requirement information of applications, services, traffic types, logical channels or logical channel groups.

5. The method of claim 1, wherein the parameters related to the partial sensing operation based on the partial sensing configuration comprise at least one of:
- a duration of a sensing window of the partial sensing operation;
- parameters indicating sensing slots of the partial sensing operation;
- a maximum number of sensing slots during the sensing window;
- a minimum number of sensing slots during the sensing window; or
- a periodicity defining how often periodic partial sensing should be performed.

6. The method of claim 1, further comprising:
- activating at least one of the one or more partial sensing configurations for use by the UE for partial sensing by transmitting, to the first UE, identification information of the at least one partial sensing configuration that needs to be activated; and/or
- deactivating at least one of the one or more partial sensing configurations by transmitting, to the first UE, identification information of the at least one partial sensing configuration that needs to be deactivated.

7. The method of claim 1, further comprising configuring a selection rule at the first UE indicating that the first UE is to select the at least one of the one or more partial sensing configurations for partial sensing based on at least one of:
- an application, a service, a traffic type, a logical channel, and/or a logical channel group, that is associated with the at least one partial sensing configuration, being used by the first UE;
- a priority of an application, a service, a traffic type, a logical channel, and/or a logical channel group that is associated with the at least one partial sensing configuration; or
- a QoS requirement of an application, a service, a traffic type, a logical channel, and/or a logical channel group that is associated with the at least one partial sensing configuration.

8. The method of claim 1, wherein:

the node is a network node serving the first UE and transmitting the one or more partial sensing configurations is implemented via one of:

system information;

a paging message;

a control Protocol Data Unit 'PDU' of a protocol layer;

Downlink Control Information (DCI);

a Media Access Control (MAC) Control Element (CE);

dedicated Radio Resource Control (RRC) signaling; or a handover command; or the node is a second UE in direct communication with the first UE and transmitting the one or more partial sensing configurations is implemented via one of:

PC5-RRC signaling;

a control PDU of a protocol layer;

a MAC CE; or

Sidelink Control Information (SCI).

9. A method, implemented by a first User Equipment (UE), the method comprising:

obtaining one or more partial sensing configurations and one or more Discontinuous Reception (DRX) configurations for the first UE, wherein the one or more partial sensing configuration comprise parameters related to a partial sensing operation based on the partial sensing configuration, wherein the parameters related to the partial sensing operation based on the partial sensing configuration comprise an indicator indicating whether the partial sensing operation is allowed to be performed during a DRX inactive slot, and wherein the one or more partial sensing configurations are associated with the one or more DRX configurations; and performing partial sensing based on at least one of the one or more partial sensing configurations and/or DRX based on at least one of the one or more DRX configurations.

10. The method of claim 9, wherein the one or more partial sensing configurations are received from:

a network node serving the first UE and via one of:

system information;

a paging message;

a control Protocol Data Unit (PDU) of a protocol layer;

Downlink Control Information (DCI);

a Media Access Control (MAC) Control Element (CE);

dedicated Radio Resource Control (RRC) signaling; or a handover command; or a second UE in direct communication with the first UE and via one of:

PC5-RRC signaling;

a control PDU of a protocol layer;

a MAC CE; or

Sidelink Control Information (SCI).

11. A node, comprising:

at least one processor; and at least one memory storing instructions that, when executed on the at least one processor, configure the node to:

generate one or more partial sensing configurations and one or more Discontinuous Reception (DRX) configurations for a first User Equipment (UE), wherein the one or more partial sensing configurations comprise parameters related to a partial sensing operation based on the partial sensing configuration, and wherein the parameters related to the partial sensing operation based on the partial sensing configuration comprise an indicator indicating whether partial sensing is allowed to be performed during a DRX inactive slot; and transmit, to the first UE, the one or more partial sensing configurations, at least one of which is to be used by the first UE for partial sensing, and the one or more DRX configurations, at least one of which is to be used by the first UE for DRX, wherein the one or more partial sensing configurations are associated with the one or more DRX configurations.

12. The node of claim 11, wherein the partial sensing configuration further comprises at least one of:

identification information of the partial sensing configuration;

identification information of resource pools related to the partial sensing configuration; or information of applications, services, traffic types, logical channels, and/or logical channel groups associated with the partial sensing configuration.

13. The node of claim 12, wherein the information of applications, services, traffic types, logical channels, and/or logical channel groups associated with the partial sensing configuration comprises at least one of:

identification information of applications, services, traffic types, logical channels, and/or logical channel groups associated with the partial sensing configuration;

priority information of applications, services, traffic types, logical channels, and/or logical channel groups associated with the partial sensing configuration; or Quality of Service (QoS) requirement information of applications, services, traffic types, logical channels or logical channel groups.

14. The node of claim 11, wherein the parameters related to the partial sensing operation based on the partial sensing configuration comprise at least one of:

a duration of a sensing window of the partial sensing operation;

parameters indicating sensing slots of the partial sensing operation;

a maximum number of sensing slots during the sensing window;

a minimum number of sensing slots during the sensing window; or a periodicity defining how often periodic partial sensing should be performed.

15. The node of claim 11, wherein the node is further configured to:

activate at least one of the one or more partial sensing configurations for use by the UE for partial sensing by transmitting, to the first UE, identification information of the at least one partial sensing configuration that needs to be activated; and/or deactivate at least one of the one or more partial sensing configurations by transmitting, to the first UE, identification information of the at least one partial sensing configuration that needs to be deactivated.

16. The node of claim 11, wherein the node is further configured to configure a selection rule at the first UE indicating that the first UE is to select the at least one of the one or more partial sensing configurations for partial sensing based on at least one of:

an application, a service, a traffic type, a logical channel, and/or a logical channel group, that is associated with the at least one partial sensing configuration, being used by the first UE;

a priority of an application, a service, a traffic type, a logical channel, and/or a logical channel group that is associated with the at least one partial sensing configuration; or a QoS requirement of an application, a service, a traffic type, a logical channel, and/or a logical channel group that is associated with the at least one partial sensing configuration.

17. The node of claim 11, wherein:

the node is a network node serving the first UE and to transmit the one or more partial sensing configurations, the node is configured to transmit:

system information;

a paging message;

a control Protocol Data Unit 'PDU' of a protocol layer;

Downlink Control Information (DCI);

a Media Access Control (MAC) Control Element (CE);

dedicated Radio Resource Control (RRC) signaling; or a handover command; or the node is a second UE in direct communication with the first UE and to transmit the one or more partial sensing configurations, the node is configured to transmit:

PC5-RRC signaling;

a control PDU of a protocol layer;

a MAC CE; or

Sidelink Control Information (SCI).

18. A first User Equipment (UE), comprising:

at least one processor, and at least one memory storing instructions that, when executed on the at least one processor, configure the first UE to:

obtain one or more partial sensing configurations and one or more Discontinuous Reception (DRX) configurations for the first UE, wherein the one or more partial sensing configuration comprise parameters related to a partial sensing operation based on the partial sensing configuration, and wherein the one or more DRX configurations are generated based on at least one partial sensing configuration that is currently in use such that the one or more partial sensing configurations are associated with the one or more DRX configurations; and perform partial sensing based on at least one of the one or more partial sensing configurations and/or DRX based on at least one of the one or more DRX configurations.

19. The first UE of claim 18, wherein the parameters related to the partial sensing operation based on the partial sensing configuration comprise an indicator indicating whether the partial sensing operation is allowed to be performed during a DRX inactive slot.

20. The first UE of claim 18, wherein the one or more partial sensing configurations are received from:

a network node serving the first UE and via one of:

system information;

a paging message;

a control Protocol Data Unit (PDU) of a protocol layer;

Downlink Control Information (DCI);

a Media Access Control (MAC) Control Element (CE);

dedicated Radio Resource Control (RRC) signaling; or a handover command; or a second UE in direct communication with the first UE and via one of:

PC5-RRC signaling;

a control PDU of a protocol layer;

a MAC CE; or

Sidelink Control Information (SCI).

* * * * *